US012440764B2

(12) United States Patent
Maeda et al.

(10) Patent No.: US 12,440,764 B2
(45) Date of Patent: Oct. 14, 2025

(54) INFORMATION PROCESSING SYSTEM, SERVER, STORAGE MEDIUM, AND INFORMATION PROCESSING METHOD

(71) Applicant: Nintendo Co., Ltd., Kyoto (JP)

(72) Inventors: Kouhei Maeda, Kyoto (JP); Yuji Ohashi, Kyoto (JP); Junichi Iida, Kyoto (JP); Shingo Matsushita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 428 days.

(21) Appl. No.: 18/071,032

(22) Filed: Nov. 29, 2022

(65) Prior Publication Data

US 2023/0173390 A1 Jun. 8, 2023

(30) Foreign Application Priority Data

Dec. 2, 2021 (JP) ............................. JP2021-196086

(51) Int. Cl.
*A63F 13/57* (2014.01)
*A63F 13/35* (2014.01)

(52) U.S. Cl.
CPC .............. *A63F 13/57* (2014.09); *A63F 13/35* (2014.09)

(58) Field of Classification Search
None
See application file for complete search history.

(56) References Cited

U.S. PATENT DOCUMENTS 10,322,351 B2 * 6/2019 Marr .................... G07F 17/3227
10,659,288 B2 * 5/2020 Takeuchi ................ H04L 41/06
10,894,215 B1 * 1/2021 Brown ..................... A63F 13/35
10,987,587 B2 * 4/2021 Garbut ..................... A63F 13/52
2006/0287099 A1 * 12/2006 Shaw .................... H04L 67/131 463/42
2007/0218997 A1 * 9/2007 Cho ......................... A63F 13/30 463/42
2013/0165237 A1 * 6/2013 Park ...................... A63F 13/332 463/42

(Continued)

FOREIGN PATENT DOCUMENTS

JP 2010-167251 8/2010
JP 2017-077393 4/2017
JP 2020-168229 10/2020

*Primary Examiner* — Seng H Lim
(74) *Attorney, Agent, or Firm* — Nixon & Vanderhye P.C.

(57) ABSTRACT

An example of a terminal apparatus designates a use object to be used in a competitive game from among a plurality of objects each being associated with an object parameter, based on a user's operation input. The example of the terminal apparatus designates a designation parameter indicating a value or range of the object parameter, based on a user's operation input. A matching request including information regarding the designated use object and information regarding the designated designation parameter is transmitted to a server. An example of the server determines, as participating users, users of two terminal apparatuses, among a plurality of terminal apparatuses, which are in such a relationship that the value of the object parameter of the use object included in the matching request of each terminal apparatus corresponds to the value or range of the designation parameter included in the matching request of the other terminal apparatus.

23 Claims, 17 Drawing Sheets

(56) References Cited

U.S. PATENT DOCUMENTS

| | | | | |
|---|---|---|---|---|
| 2014/0274362 | A1* | 9/2014 | Dhawan | A63F 13/798<br>463/29 |
| 2017/0118295 | A1 | 4/2017 | Yamamura et al. | |
| 2017/0225079 | A1* | 8/2017 | Conti | A63F 13/35 |
| 2020/0206623 | A1* | 7/2020 | Nakano | A63F 13/525 |
| 2020/0206638 | A1* | 7/2020 | Nakano | A63F 13/795 |
| 2020/0206639 | A1* | 7/2020 | Nakano | A63F 13/58 |
| 2020/0235984 | A1* | 7/2020 | Takeuchi | H04L 41/06 |
| 2020/0306649 | A1* | 10/2020 | Aita | A63F 13/798 |
| 2020/0316467 | A1 | 10/2020 | Matsushita et al. | |
| 2021/0001234 | A1* | 1/2021 | Shoji | A63F 13/48 |
| 2021/0162307 | A1* | 6/2021 | Araya | A63F 13/67 |
| 2022/0314127 | A1* | 10/2022 | Konishi | A63F 13/86 |
| 2023/0094057 | A1* | 3/2023 | Takahashi | A63F 13/795<br>463/40 |
| 2023/0285856 | A1* | 9/2023 | Zhang | A63F 13/52 |

* cited by examiner

Fig.9

| USER A | USER B | SETTING |
|---|---|---|
| "USE OWN SETTING" | "LEAVE IT UP TO OPPONENT" | SETTING OF USER A |
| "LEAVE IT UP TO OPPONENT" | "USE OWN SETTING" | SETTING OF USER B |
| "LEAVE IT UP TO OPPONENT" | "LEAVE IT UP TO OPPONENT" | AUTOMATIC SETTING |
| "USE OWN SETTING" | "USE OWN SETTING" | SETTING OF USER A AND USER B (BOTH USERS SHOULD HAVE SAME SETTING) |

INFORMATION PROCESSING SYSTEM, SERVER, STORAGE MEDIUM, AND INFORMATION PROCESSING METHOD

CROSS REFERENCE TO RELATED APPLICATION

This application claims priority to Japanese Patent Application No. 2021-196086, filed on Dec. 2, 2021, the entire contents of which are incorporated herein by reference.

FIELD

The technique shown here relates to an information processing system, a server, a storage medium, and an information processing method for determining participating users of a competitive game.

BACKGROUND AND SUMMARY

Conventionally, participating users of a competitive game have been determined by matching users in the competitive game.

When matching a user with an opponent in a competitive game, it is desired to determine an opponent suitable for the user.

Therefore, the present application discloses an information processing system, a server, a storage medium, and an information processing method which are capable of determining an opponent suitable for a user.

(1)

An example of an information processing system described herein determines participating users of a competitive game. The information processing system comprises a server, and a plurality of terminal apparatuses communicable with the server. Each of the terminal apparatuses is configured to at least: designate a use object to be used in the competitive game from among a plurality of objects each being associated with a predetermined object parameter, based on an operation input performed by a user to the terminal apparatus; designate a designation parameter indicating a value or a range of the object parameter, based on an operation input performed by the user to the terminal apparatus; and transmit, to the server, a matching request including information regarding the designated use object and information regarding the designated designation parameter. The server is configured to at least, when receiving, from a plurality of terminal apparatuses, matching requests in which the value of the object parameter of the use object corresponds to the value or the range of the designation parameter, determine, as the participating users, users of two terminal apparatuses, among the plurality of terminal apparatuses, which are in such a relationship that the value of the object parameter of the use object included in the matching request of each terminal apparatus corresponds to the value or the range of the designation parameter included in the matching request of the other terminal apparatus.

According to the configuration of the above (1), the information processing system determines the participating users while taking into consideration the designation parameter designated by the user, whereby an opponent suitable for the user can be determined.

(2)

The terminal apparatus may execute an application of the competitive game. The object parameter associated with the object may indicate a value according to a version that corresponds to the object, among versions of the application.

According to the configuration of the above (2), the user can perform the competitive game under the condition that an object corresponding to a specific version is used as a use object.

(3)

The terminal apparatus may execute an application of the competitive game. The object parameter associated with the object may indicate a value according to a time when the object has become usable in the application.

According to the configuration of the above (3), the user can perform the competitive game under the condition that an object that has become usable in a specific period is used as a use object.

(4)

An application of the competitive game may include a plurality of games different from the competitive game. Each of the plurality of objects may appear in any of the plurality of games. The object parameter associated with the object may indicate a value according to the game in which the object appears.

According to the configuration of the above (4), the user can perform the competitive game under the condition that an object that appears in a specific game among the plurality of games in the application is used as a use object.

(5)

Each of the plurality of objects may belong to any of a plurality of groups. The object parameter associated with the object may indicate a value according to the group to which the object belongs.

According to the configuration of the above (5), the user can perform the competitive game under the condition that an object that belongs to a specific group is used as a use object.

(6)

The competitive game may be able to be executed in at least one of a first mode and a second mode. A rate associated with the user may vary according to a result of the competitive game in the first mode. The rate does not have to vary according to the result of the competitive game in the second mode. The server, in the second mode, may perform determination of participating users based on the designation parameter. The server, in the first mode, does not have to perform determination of participating users based on the designation parameter.

According to the configuration of the above (6), the user can designate a condition regarding an opponent by using the designation parameter in the second mode, whereas, in the first mode, the designation parameter is not used for determination of the participating users. Therefore, the possibility that the user takes an excessive advantage can be reduced.

(7)

The terminal apparatus, based on an operation input performed by the user to the terminal apparatus, may further designate game setting information including: (a) first information indicating game setting regarding a rule of the competitive game and indicating that the game setting is applied; or (b) second information indicating that game setting designated by another user to be an opponent is applied. The matching request may include the designated game setting information. The server may determine the participating users, based on the game setting information included in the matching request.

According to the configuration of the above (7), the user can perform the competitive game under the condition that the competitive game is performed with desired game setting. In addition, the second information facilitates determination of the participating users.

(8)

The server may determine, as the participating users, a user of the terminal apparatus that has transmitted the matching request including the game setting information including the first information, and a user of the terminal apparatus that has transmitted the matching request including the game setting information including the second information. The server may determine the game setting in the competitive game to be performed by the terminal apparatuses, based on the game setting information including the first information.

According to the configuration of the above (8), the participating users can be appropriately determined while performing the competitive game with the game setting desired by the user.

(9)

The server may determine, as the participating users, users of two terminal apparatuses that have transmitted the matching requests including the game setting information including the second information. The server may automatically determine the game setting in the competitive game to be performed by the terminal apparatuses.

According to the configuration of the above (9), since the game setting is automatically determined, users corresponding to the matching requests including the second information can be determined as the participating users. This facilitates the determination of the participating users.

(10)

The server may determine, as the participating users, users of two terminal apparatuses that have transmitted matching requests including the game setting information including the first information, under a condition that the game settings indicated by the first information are the same. The server may determine the game setting in the competitive game to be performed by the terminal apparatuses, based on the game setting information.

According to the configuration of the above (10), since users corresponding to the matching requests including the first information are determined as the participating users, determination of the participating users can be further facilitated.

In the present specification, an example of an information processing apparatus (e.g., a terminal apparatus or a server) for executing the processes in the above (1) to (10) is disclosed. Furthermore, in the present specification, an example of a storage medium stores an information processing program (e.g., a game program) that causes a computer to execute all or some of the processes is disclosed. Moreover, in the present specification, an example of an information processing method (e.g., a game processing method) to be executed in the information processing system according to the above (1) to (10) is disclosed.

According to the information processing system, the server, the storage medium, and the information processing method, it is possible to determine an opponent suitable for a user.

These and other objects, features, aspects and advantages of the exemplary embodiment will become more apparent from the following detailed description when taken in conjunction with the accompanying drawings.

BRIEF DESCRIPTION OF THE DRAWINGS

FIG. 9 shows an example of a game setting determination method in the non-limiting competitive game;

DETAILED DESCRIPTION OF NON-LIMITING EXAMPLE EMBODIMENTS

[1. Configuration of Information Processing System]

Figure 1:
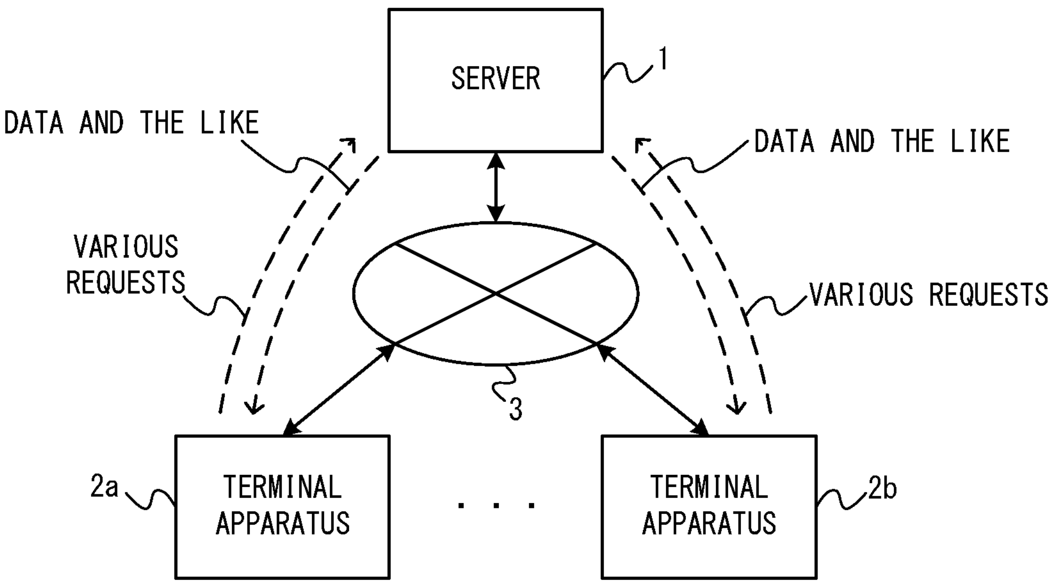
FIG. 1 is a block diagram showing an example of a configuration of a non-limiting information processing system according an exemplary embodiment.

Hereinafter, an information processing system, an information processing program, and an information processing method according to the exemplary embodiment will be described. Firstly, description will be given of the overall configuration of the information processing system and the configurations of the terminal apparatus and a server included in the information processing system according to the exemplary embodiment. FIG. 1 is a block diagram showing an example of the configuration of the information processing system according to the exemplary embodiment. As shown in FIG. 1, the information processing system includes a server 1 and a plurality of terminal apparatuses (terminal apparatuses 2*a* and 2*b* in the example of FIG. 1). Hereinafter, any one of the plurality of terminal apparatuses may sometimes be referred to as "terminal apparatus 2". The server 1 and the terminal apparatus 2 are connectable to a network 3, such as the Internet and/or a mobile communication network. The server 1 and the terminal apparatus 2 are communicable with each other via the network 3.

The server 1 is a server for providing services related to an application (specifically, a game application) to be executed in the terminal apparatus 2. In the exemplary embodiment, the server 1 is a game server for a game to be executed in the terminal apparatus 2, and provides an environment for a game process to be executed in the terminal apparatus 2. For example, in response to a request from the terminal apparatus 2 that executes the game process, the server 1 executes a game process according to need, and transmits, to the terminal apparatus 2, data complying with the request (refer to FIG. 1).

The terminal apparatus 2 is an example of an information processing apparatus possessed by a user. Examples of the terminal apparatus 2 include a smart phone, a hand-held or stationary game apparatus, a mobile phone, a tablet terminal, a personal computer, and a wearable terminal. The terminal apparatus 2 is able to execute a game program (in other words, a game application) for a game for which the server 1 provides services. The respective terminal apparatuses included in the information processing system may be information processing apparatuses of the same type, or may be information processing apparatuses of different types.

(Specific Example of Configuration of Server 1)

Figure 2:
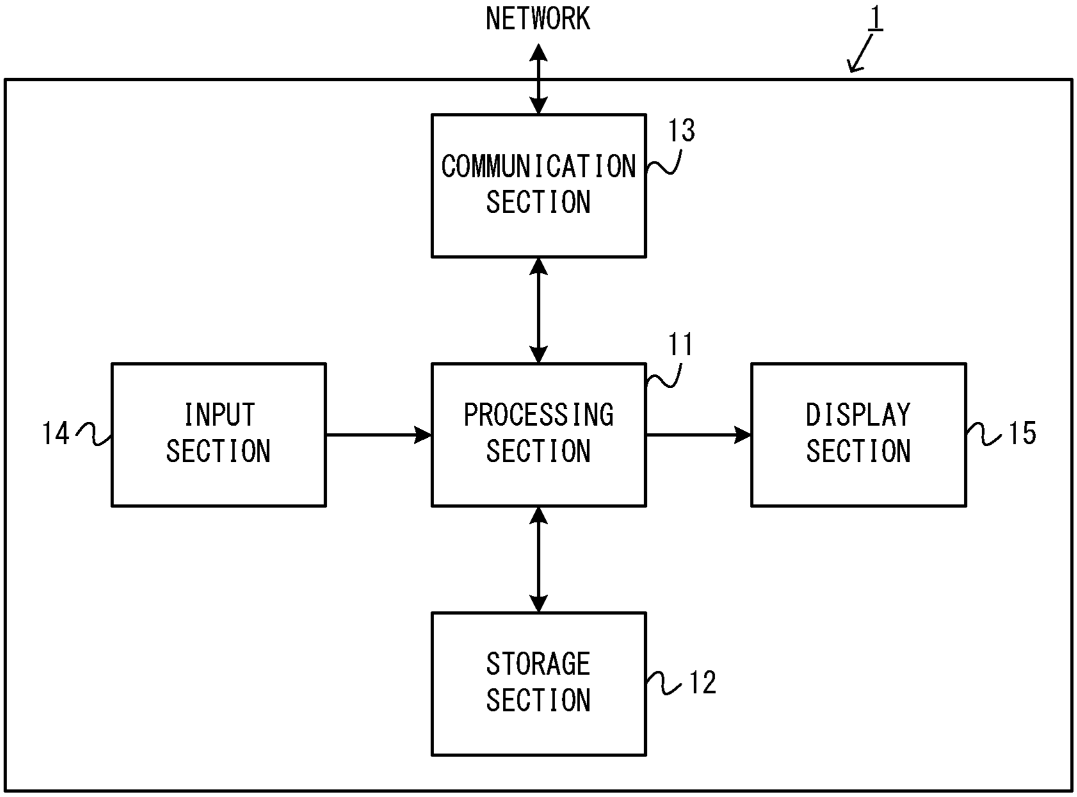
FIG. 2 is a block diagram showing an example of a configuration of a non-limiting server.

FIG. 2 is a block diagram showing an example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the exemplary embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory. In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the exemplary embodiment, the storage section 12 stores therein at least a program for a game process that is to be executed on the server side for a game process to be executed in the terminal apparatus 2.

The server 1 includes a communication section 13. The communication section 13 is connected to the network 3, and has a function of communicating with other devices (e.g., the terminal apparatus 2) via the network 3. The server 1 further includes an input section 14 and a display section 15 as input/output interfaces.

(Specific Example of Configuration of Terminal Apparatus 2)

Figure 3:
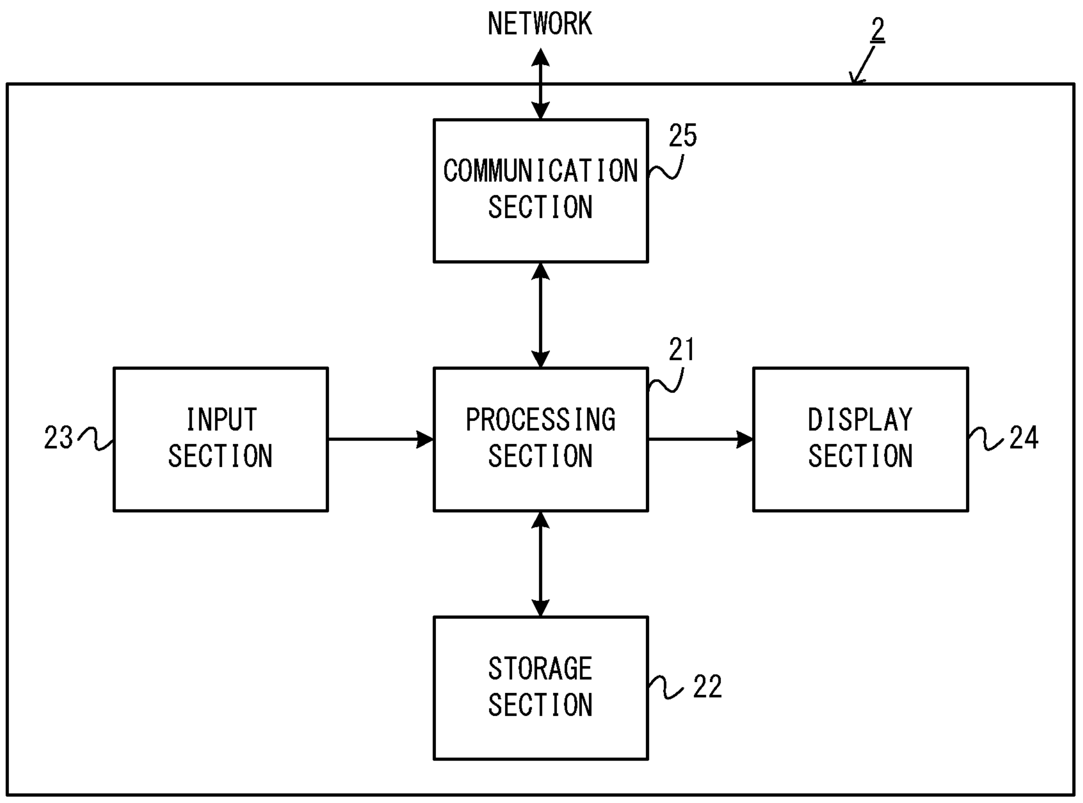
FIG. 3 is a block diagram showing an example of a configuration of a non-limiting terminal apparatus.

FIG. 3 is a block diagram showing an example of the configuration of the terminal apparatus 2. As shown in FIG. 3, the terminal apparatus 2 includes a processing section 21 and a storage section 22. The processing section 21 is electrically connected to the components 22 to 25 of the terminal apparatus 2. The processing section 21 includes a CPU (in other words, a processor) and a memory. In the terminal apparatus 2, the CPU executes, using the memory, a program (specifically, a game program) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the terminal apparatus 2, or may be a storage medium (e.g., a card type storage medium) attachable/detachable with respect to the main body unit. The program may be stored in the main body unit by being downloaded from the server 1 to the terminal apparatus 2.

The terminal apparatus 2 includes an input section 23. The input section 23 may be any input device that receives an input performed by the user. In the exemplary embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the terminal apparatus 2, or may be an input device (e.g., a game controller) separated from the main body unit.

The terminal apparatus 2 includes a display section 24. The display section 24 displays an image (e.g., a game image, etc.) that is generated through information processing executed in the processing section 21 of the terminal apparatus 2. The display section 24 may be a display device provided in the main body unit of the terminal apparatus 2, or may be a display device separated from the main body unit. The terminal apparatus 2 may include a speaker, a microphone, and/or a camera, etc.

The terminal apparatus 2 includes a communication section 25. In the exemplary embodiment, the communication section 25 has a function of performing communication while being connected to a mobile communication network (in other words, a mobile telephone communication network). That is, the terminal apparatus 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the terminal apparatus 2 performs communication via the network 3, is arbitrary. For example, the communication section 25 may have a function of connecting to a wireless LAN through a communication module with Wi-Fi authentication, or may have both the function of connecting to the mobile communication network and the function of connecting to the wireless LAN.

[2. Outline of Processing in Information Processing System]

Hereinafter, the outline of processing executed in the information processing system according to the exemplary embodiment will be described. In the exemplary embodiment, a competitive game using game characters (hereinafter referred to simply as "characters") is executed in a game application to be executed in the information processing system. In the exemplary embodiment, a simulation game in which a character being operated by a user is regarded as a unit (in other words, a piece) and is caused to fight with an enemy character, is performed. The characters are examples of game objects, and are persons that appear in the game, for example. However, the characters are not limited to persons and may be any objects as long as they have individualities in the setting of the game. For example, animals, weapons, items, etc., may be used as game objects.

[2-1. Flow of Competitive Game]

The competitive game of the exemplary embodiment is a game in which two teams each including a plurality of characters fight against each other. Hereinafter, the description will be given of a case where the competitive game is mainly performed in the terminal apparatus 2*a* among the plurality of terminal apparatuses included in the information processing system. A team operated by the user of the terminal apparatus 2*a* is referred to as "own army team", and a team that is an opponent of the own army team is referred to as "enemy army team". Further, a character included in the own army team is referred to as "own army character", and a character included in the enemy army team is referred to as "enemy army character".

The enemy army team may be operated by another user different from the user of the terminal apparatus 2*a*, or may be controlled by the information processing system (i.e., by the information processing system using a predetermined algorithm and/or AI). If the enemy army team is operated by the another user, another terminal apparatus (e.g., the terminal apparatus 2*b* shown in FIG. 1) different from the terminal apparatus 2*a* is used by the another user, and the another terminal apparatus 2*b* receives an input performed by the another user. The terminal apparatus 2*a* and the another terminal apparatus 2*b* communicate with each other directly or via the server 1, and exchange game data (e.g., data indicating an input performed to a terminal apparatus, data indicating a motion of a character controlled by the input, or the like), whereby the competitive game is progressed. Meanwhile, when the enemy army team is controlled (or operated) by the information processing system, the server 1 controls the enemy army team, and game data is exchanged between the server 1 and the terminal apparatus 2*a*, whereby the competitive game is progressed. When the enemy army team is controlled by the information processing system, a terminal apparatus 2 may control the enemy army team (independently of a user's instruction).

Figure 4:
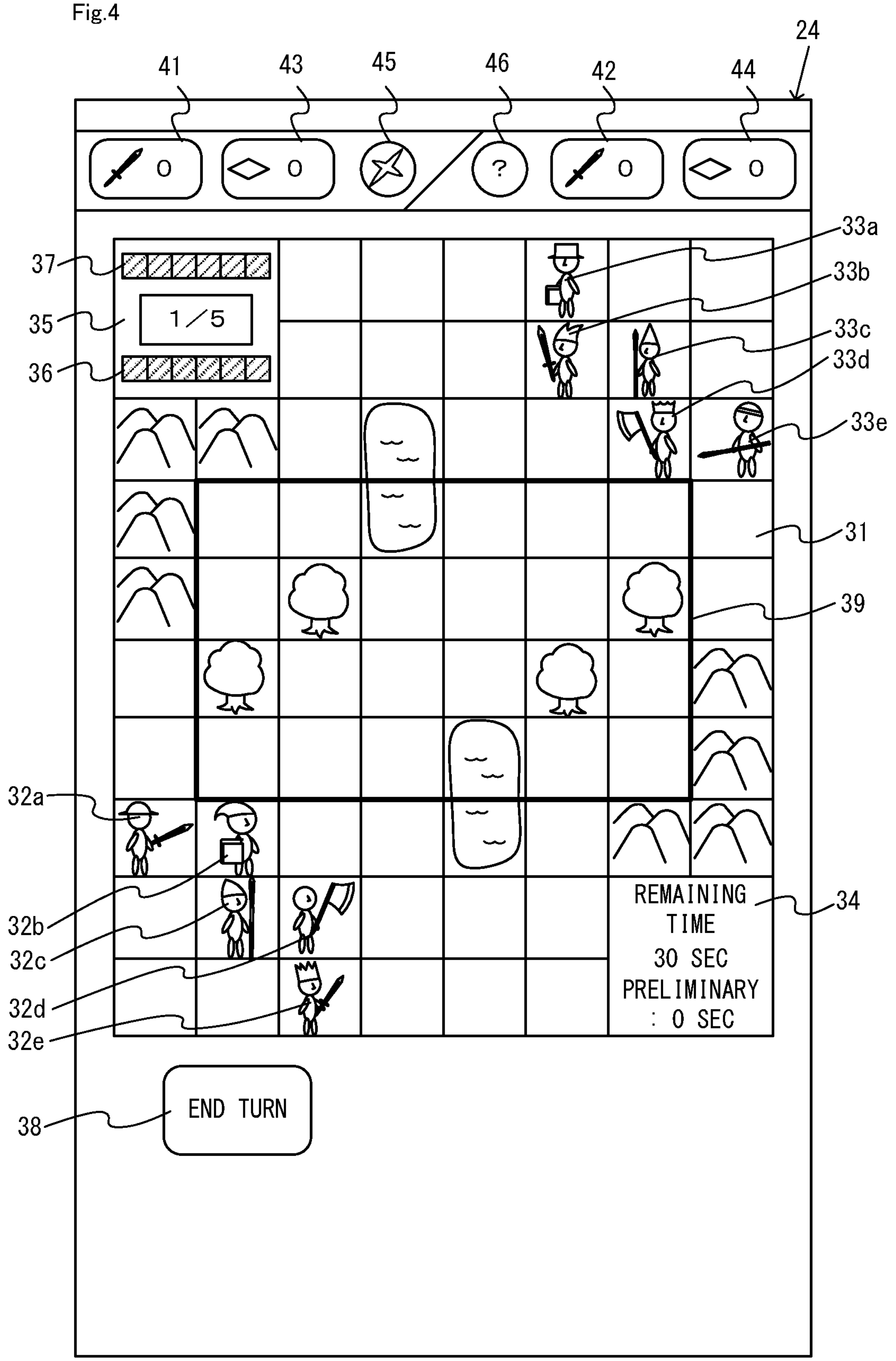
FIG. 4 shows an example of a game image displayed in the non-limiting information processing system.

FIG. 4 shows an example of a game image displayed in the information processing system. As shown in FIG. 4, own army characters 32*a* to 32*e* and enemy army characters 33*a* to 33*e* are placed in a game space 31. In the exemplary embodiment, when the competitive game is started, one team includes five characters. However, the number of characters included in one team may be any number not less than 2.

In the exemplary embodiment, an own army character to be used in the competitive game is determined based on an instruction of the user of the terminal apparatus 2*a*. Specifically, before the start of the competitive game, the user selects a character to be used as an own army character from among characters possessed by the user (i.e., characters that the user can use in the game application of the competitive game). The information processing system may impose limitation on own army characters that can be included in the own army team. For example, the information processing system may impose a limitation such that only one character having a special skill (e.g., a skill of enabling another own army character to act again) can be included in the own army team.

In the exemplary embodiment, one of the five characters included in each team is set as a captain character. The captain character will be described later in detail. When designating five characters to be included in the team that the user operates, the user designates a captain character from among the five characters.

As shown in FIG. 4, the game space 31 of the exemplary embodiment is divided into squares, and one character is placed in one square. In another embodiment, the game space may not necessarily be divided into squares. In the exemplary embodiment, the game space 31 has a size of vertical 10 squares×horizontal 8 squares. However, the game space 31 is not rectangular in shape, for the purpose of efficiently utilizing the display area of the display section 24 of the terminal apparatus 2*a*. Of the rectangular area consisting of vertical 10 squares×horizontal 8 squares, an area having a size of vertical 2 squares×horizontal 2 squares at a lower right corner is a remaining time area 34. Furthermore, of the rectangular area, an area having a size of vertical 2 squares×horizontal 2 squares at an upper left corner is a number-of-turns area 35. The remaining time area 34 is an area for displaying a remaining time, etc., when the user performs an operation to an own army character. The number-of-turns area 35 is an area for displaying the number of turns, etc., in the competitive game. The remaining time area 34 and the number-of-turns area 35 will be described later in detail.

The competitive game of the exemplary embodiment is a move-based game that is progressed while moves for operating characters in teams are sequentially switched between the teams (or in team units). Furthermore, the competitive game of the exemplary embodiment is also a turn-based game, and limitation is imposed on the number of times one character can act in one turn. Moreover, in the competitive game of the exemplary embodiment, the number of moves to be given to one team in one turn (upper limit number of moved described later) is determined.

Figure 5:
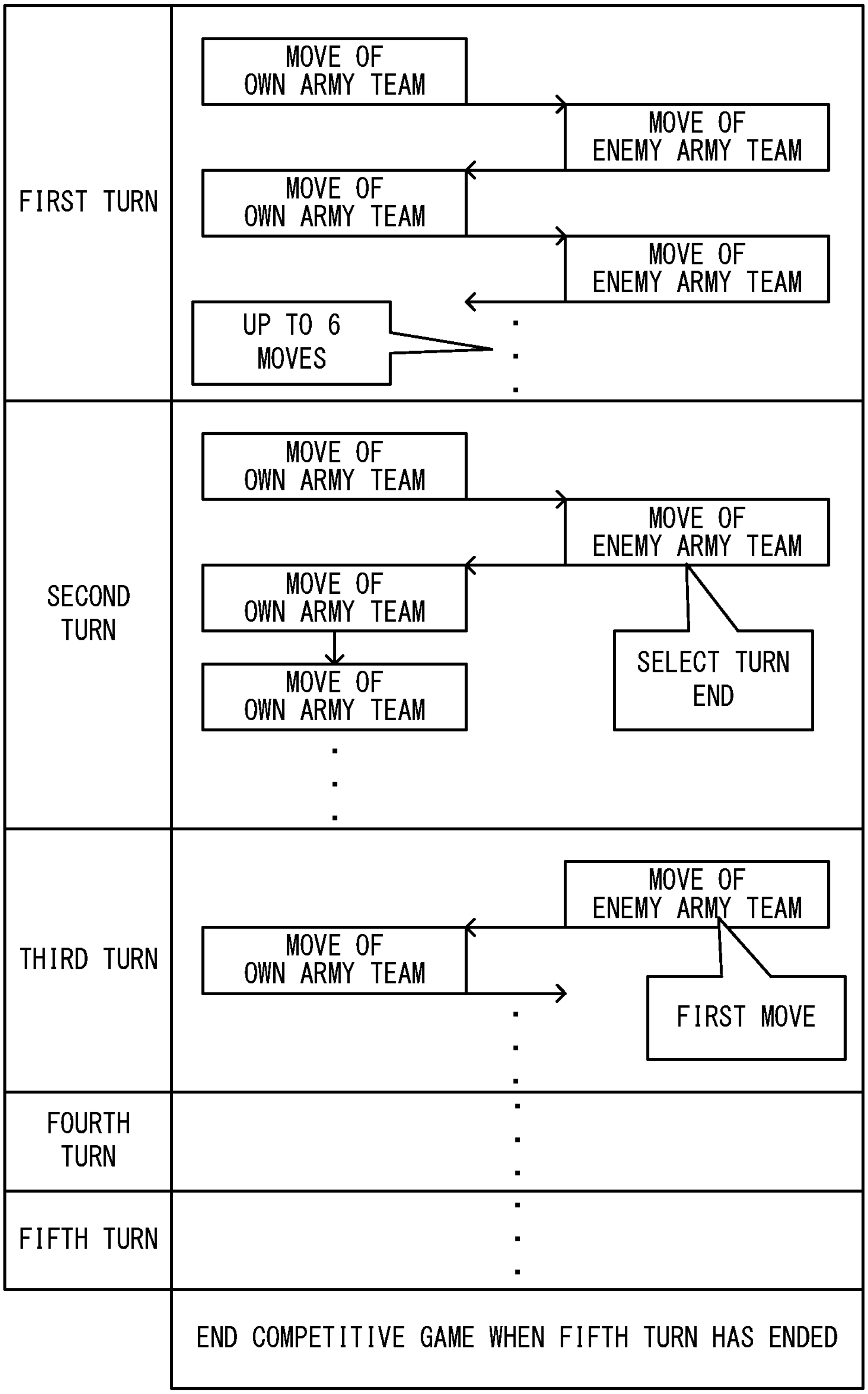
FIG. 5 shows an example of moves and turns that are progressed in a non-limiting competitive game.

FIG. 5 shows an example in which moves and turns are progressed in the competitive game. In the first turn in the example shown in FIG. 5, moves are alternately given to the two teams. Thus, in the information processing system, moves are basically set such that moves are alternately given to the two teams (i.e., such that a move for one of the teams is followed by a move for the other team). In the exemplary embodiment, however, there is an exception in setting of moves, and moves are not alternately given to the two teams in some cases.

When a move is set for a team, this team is put in an operable state. That is, in this case, characters included in this team become operable. The user of the terminal apparatus 2*a* becomes able to operate the own army characters when a move is set for the own army team. Meanwhile, when a move is set for the enemy army team, the enemy army characters become operable by another user or the information processing system.

In the exemplary embodiment, in one move, the information processing system receives one operation for one character. In the exemplary embodiment, one operation can cause a character to perform any of actions as follows.

- movement
- stand-by
- attack on an opponent character
- assisting motion for an ally character
- motion in which movement and attack are combined
- motion in which movement and assisting motion are combined
- motion that exercises a special skill The "movement" is a motion of the character moving in the game space 31. The distance that a character can move is set for each character.

The "stand-by" is a motion of the character waiting at the current position. In the competitive game of the exemplary embodiment, since the user may want to progress a move without moving the character from the current position, the information processing system enables the character to perform a motion of stand-by.

The "attack" is a motion of attacking one character of an opponent team located in an attack-allowed range that is set for each character. When an attack motion has been performed, a battle is performed between the character having taken the motion and the one character of the opponent team. The information processing system decreases hit points of each character according to the result of the battle. When the hit points of a character have become 0, the information processing system causes this character to disappear from the game space 31.

The "assisting motion" is, for example, a motion of regaining hit points of an ally character to be a target, a motion of improving the ability of an ally character, a motion of moving an ally character (e.g., interchanging the positions of an adjacent ally character and a character that performs the assisting motion), or a motion of causing an ally character to perform an action again (i.e., releasing an action completed state described later). A range in which the assisting motion can be performed is set in advance for each type of the assisting motion.

The "motion in which movement and attack are combined" is, for example, a motion of the character moving in the game space 31 and performing an attack at a position to which the character has moved. The "motion in which movement and assisting motion are combined" is, for example, a motion of the character moving in the game space 31 and performing an assisting motion at a position to which the character has moved. In the exemplary embodiment, as for a character having a predetermined skill (i.e., a skill of re-movement), this character can move after performing an attack or an assisting motion. Such a character can also perform an attack or an assisting motion after movement and thereafter can further move, in one operation, as the motion in which movement and attack or assisting motion are combined.

The special skill is a skill possessed by a specific type of character among characters that can be used in the competitive game. There is no limitation on the content of the special skill. For example, the special skill is a skill of damaging an opponent character, a skill of improving the ability of the own character or an ally character, or a skill of causing the own character or an ally character to perform an action again. In the exemplary embodiment, the special skill is a skill of a type different from the skill (i.e., normal skill) possessed by the characters different from the specific type of character, and exerts an effect different from that of the normal skill. In another embodiment, however, the special skill may exert the same effect as the normal skill. A condition may be imposed on the timing of the special skill or the number of times the special skill can be exercised in one competitive game.

As described above, in the exemplary embodiment, an action of a character that consumes one move includes a motion of exercising a special skill, in addition to motions such as movement and attack. Therefore, a character cannot perform two motions, e.g., attack and exercitation of a special skill, in one move, thereby reducing inconvenience that a character having a special skill takes an excessive advantage. Furthermore, strategic characteristics are generated as to which motion a character should perform in one move, between attack and exercitation of a special skill, thereby improving the strategic characteristics of the competitive game.

In the exemplary embodiment, in one move, the user is allowed to perform one operation on one character (in other words, one character is allowed to take one action). That is, when one operation has been completed in one move, a next move is given to the other team (i.e., a next move is set for the other team). Thus, when an action of one character included in a team in an operable state has been completed, the information processing system again sets a team to be operable, and progresses the competitive game. Thus, the information processing system can perform the competitive game in which the teams progress the game while alternately taking a move. In another embodiment, the number of operations that the user can perform on a character (in other words, the number of actions that the character performs) in one move may be a predetermined number not less than 2.

In the exemplary embodiment, when a character has been caused to take an action during a turn and has satisfied an action end condition, the information processing system sets this character in an action completed state. The action completed state is a state where an action by this character is limited. That is, the information processing system limits an action by the character in the action completed state. The user cannot perform an operation on the character in the action completed state. This avoids a situation that the game becomes too advantageous for the user who operates the same character many times in one turn.

In the exemplary embodiment, the action end condition for a character having no special skill is that one operation of any content has been performed on the character (in other words, the character has completed an action according to the operation). That is, the character having no special skill enters the action completed state when the character has completed one action according to one operation. Meanwhile, the action end condition for a character having the special skill is that the character has performed both a motion of exercising the special skill and a motion other than exercitation of the special skill. That is, when the character having the special skill has performed a motion of exercising the special skill according to one operation and further performed a motion other than exercitation of the special skill according to another operation, the character enters the action completed state. In the state where no special skill can be exercised (e.g., when a special skill that can be exercised only once in one competitive game has already been exercised), even the character having the special skill enters the action completed state when the character has completed one action according to one operation.

As described above, in the exemplary embodiment, the characters included in each team are divided into characters of a first type having special skills and characters of a second type having no special skills. As for a character of the first type, the information processing system determines that the action end condition is satisfied when the system has caused the character to perform the motion of exercising a special skill and a motion different from the motion, once for each motion. Meanwhile, as for a character of the second type, the information processing system determines that the action end condition has been satisfied when the character has been caused to perform one action. Here, a case where the character of the first type is set in the action completed state when the character has performed one action, like a character of the second type, is considered. In this case, when this character has performed a motion of exercising the special skill, the character cannot perform another motion such as movement during the current turn, and therefore, this character takes an excessive disadvantage. In contrast, in the exemplary embodiment, since the action end condition for the character of the first type is determined as described above, the character of the first type is prevented from taking an excessive disadvantage.

As shown in FIG. 4, the number-of-turns area 35 in the game image includes an own army move image 36 and an enemy army move image 37. The own army move image 36 represents remaining moves of the own army team in the current turn, and the enemy army move image 37 represents remaining moves of the enemy army team in the current turn. Specifically, each of the move images 36 and 37 includes marks as many as the number of the remaining moves of the corresponding team (in FIG. 4, six square marks). When a turn is started, the terminal apparatus 2*a* displays the move images 36 and 37 such that each image includes marks as many as an upper limit number of moves (i.e., six marks) described later, and updates the move image 36 or 37 such that the number of the marks included in the move image 36 or 37 of the corresponding team is decreased one by one as the moves of the team are consumed as described above. The move images 36 and 37 notify the user of the remaining moves of each team.

As described above, in the exemplary embodiment, a character that has entered an action completed state in a certain turn cannot perform a further action in this turn. In the exemplary embodiment, however, if an action resumption condition is satisfied after the character has entered the action completed state, the information processing system releases the character from the action completed state. The character released from the action completed state is allowed to perform an action again during this turn.

In the exemplary embodiment, a character may be released from an action completed state by an effect due to a predetermined action resumption skill (which may be a special skill as described above) possessed by the character itself or an ally character, or an effect due to an assisting action performed on the character by an ally character (i.e., an assisting action that enables action resumption). That is, in the exemplary embodiment, the action resumption condition is that the action resumption skill has been exercised for the character, or that an assisting action that enables the character to perform an action again has been performed on the character. There is no limitation on the method for releasing the action completed state, and the character may be released from the action completed state according to another condition (e.g., a predetermined item having been used). In another embodiment, a method for releasing a character from an action completed state may not necessarily be prepared.

In the exemplary embodiment, in a case where a character, which has been operated by consuming one move and entered an action completed state, is released from the action completed state, one more move is consumed to operate this character again. That is, in the exemplary embodiment, causing a character to perform an action again means enabling this character to perform one more action in one turn, and does not mean enabling this character to perform two actions in one move. This prevents the character that performs an action again from taking an excessive advantage.

In the exemplary embodiment, when a move is set for a team, the information processing system sets a time limit in which a character in this team can be operated in this move. In the exemplary embodiment, the information processing system manages, as the time limit, a move remaining time and a preliminary time. As shown in FIG. 4, in the remaining time area 34 in the game image, the move remaining time (30 seconds in FIG. 4) and the preliminary time (0 seconds in FIG. 4) are displayed. Display of the move remaining time and the preliminary time is updated according to countdown by the information processing system.

The move remaining time is set for each one move, and is set to 30 seconds when the move is started. The information processing system starts countdown of the move remaining time when the move is started. The preliminary time is time to be consumed when the move remaining time has become 0. That is, in a case where an operation on a character is not completed even when the move remaining time (i.e., 30 seconds) has elapsed in one move, the information processing system starts countdown of the preliminary time. Then, when the preliminary time has become 0, the information processing system determines that the user's operation time has reached the time limit. That is, the length of the time limit is a sum of the move remaining time and the preliminary time. In another embodiment, the preliminary time may not necessarily be prepared. That is, the length of the move remaining time may be the length of the time limit.

In the exemplary embodiment, when the user's operation time has reached the time limit, the information processing system automatically (i.e., independently of a user's operation) performs an operation on a character in the team in which a move is set. Specifically, in the exemplary embodiment, in the above case, the terminal apparatus 2*a* switches an operation mode from a manual operation mode in which a user operates a character to an automatic operation mode in which a character is automatically operated. Thus, in the move in which the user's operation time has reached the time limit, one of the characters in the own army team is automatically operated in the automatic operation mode. After the move in which the operation time has reached the time limit is finished, the user can return the operation mode from the automatic operation mode to the manual operation mode. The information processing system can switch the manual operation mode to the automatic operation mode according to an instruction of the user.

As described above, in the exemplary embodiment, in a case where, for one or more characters included in a team set in an operable state, an operation by the user corresponding to the team has not been performed within the time limit, the information processing system automatically causes one of the one or more characters to perform an action. Thus, user's thinking time in one move does not become too long, whereby the information processing system can progress the competitive game at a good tempo. In another embodiment, in the above case, the information processing system may consume one move without causing a character to perform an action.

In the exemplary embodiment, when the competitive game is started, the preliminary time is set to a predetermined value (e.g., 0 seconds). When an operation on a character has been completed before the move remaining time reaches 0 seconds, the information processing system adds the preliminary time, based on the length of the move remaining time at the completion of the operation. For example, a time equivalent to a predetermined proportion (e.g., half) of the move remaining time at the completion of the operation is added to the preliminary time. Therefore, the user can increase the preliminary time by quickly completing the operation in the move to leave the move remaining time. By increasing the preliminary time, the user can take a longer time than the move remaining time (30 seconds) to think about the operation in a certain one move. Thus, the preliminary time being set as described above can improve the strategic characteristics of the competitive game.

As described above, in the competitive game of the exemplary embodiment, the game is progressed such that moves are sequentially switched in team units during one turn (see FIG. 5). In the exemplary embodiment, when a turn end condition has been satisfied, the current turn is ended.

In the exemplary embodiment, the turn end condition is that a team end condition has been satisfied for each of the teams. That is, when the team end condition has been satisfied for both the own army team and the enemy army team, the information processing system determines that the turn end condition has been satisfied. The team end condition is that at least one of the first to third conditions below is satisfied.

First condition: a predetermined upper limit number of moves (6 moves in the exemplary embodiment) have been completed.

Second condition: a turn end instruction has been made.

Third condition: the team has no character capable of performing an action.

Regarding the first condition, in a case where six moves have been given to one team and the sixth move has been completed (i.e., when an action of a character in the sixth move has been completed), the first condition has been satisfied for this team. If the second or third condition has been satisfied before the first condition is satisfied, the team end condition is satisfied before all the six moves are given to the team. That is, the information processing system sequentially sets the teams in operable states, with the upper limit number of moves (i.e., six moves) being set for each team, during a period until the turn end condition is satisfied once (i.e., during one turn) in the competitive game. Thus, the number of moves in one turn is prevented from becoming too large, thereby reducing the possibility that the competitive game becomes too long.

In the exemplary embodiment, since a character for which the action resumption condition has been satisfied and a character having a special skill can perform a plurality of actions in one turn, there is a possibility that a character that has not yet performed an action is present even after the six moves have been consumed with respect to the five characters in one team. Even in this case, it is determined that the team end condition is satisfied when the first condition is satisfied. Thus, even when at least one character included in the teams is not yet in the action completed state, if each of the teams has become operable by the number of times equivalent to the upper limit number of moves (six time in the exemplary embodiment), the information processing system determines that the team end condition has been satisfied for each team, and consequently determines that the turn end condition has been satisfied. Thus, even when a character for which the action resumption condition has been satisfied and a character having a special skill are present, the number of moves in one turn is prevented from becoming too large. Thus, the possibility that the competitive game becomes too long can be reduced.

Regarding the second condition, in the exemplary embodiment, the game image during the competitive game includes a turn end button image 38 (see FIG. 4). The turn end button image 38 is a button image for the user of the terminal apparatus 2*a* to perform a turn end instruction. That is, when an input of designating the turn end button image 38 (e.g., an input of touching the turn end button image 38) has been performed by the user, the information processing system determines that the second condition has been satisfied for the team corresponding to the terminal apparatus 2*a*.

After the user has performed the turn end instruction, further moves are not given to the team of the user in the current turn, so that this team does not become operable. In this case, not all the six moves are given to this team in the current turn. As will be described in detail below, in the exemplary embodiment, if the number of moves for a team in the current turn is reduced, this team may sometimes be set in an advantageous state in the next turn. Therefore, in the exemplary embodiment, the user is allowed to make a turn end instruction before six moves are consumed.

Regarding the third condition, in a case where all the characters included in a team have become incapable of performing an action, the information processing system determines that the team end condition has been satisfied for this team. The "case where all the characters included in a team have become incapable of performing an action" is, in the exemplary embodiment, a case where all the characters included in the team have entered the action completed states or have disappeared from the game space 31. Therefore, the information processing system determines that the turn end condition has been satisfied, when the condition that all the characters placed in the game space 31 at that time have entered the action completed states is satisfied (i.e., when the third condition has been satisfied for each team). In this case, since no move is given to a team that does not have a character capable of performing an action, the competitive game can be smoothly progressed.

When any of the first to third conditions has been satisfied and consequently the team end condition has been satisfied with respect to a certain team, the current turn of this team is ended. In this case, the information processing system consecutively sets moves for the other team that has not yet satisfied the team end condition. For example, in the example shown in FIG. 5, the enemy army team selects "turn end" in the first move in the second turn. In this case, in the second turn, the second to sixth moves of the own army team are consecutively set (see FIG. 5). Thus, in the exemplary embodiment, when the second condition or the third condition has been satisfied for one of the teams during a turn, the information processing system consecutively sets moves in the other team in the rest of the turn.

As described above, in the exemplary embodiment, when none of the second condition and the third condition have been satisfied in a turn, moves are alternately set for the respective teams (see the first turn in FIG. 5), whereas, when the second condition or the third condition has been satisfied, moves are consecutively set for a team that has not yet satisfied the second condition or the third condition (see the second turn in FIG. 5).

When the team end conditions have been satisfied for the respective teams, the information processing system determines that the turn end condition has been satisfied, and ends the turn. In the exemplary embodiment, one competitive game is continued up to five turns, except for a case where all the characters in one team have disappeared. Therefore, when a turn has ended, a next turn is started until the fifth turn ends. When a new turn has started, the information processing system releases all the characters, except for the characters that have already disappeared, from their action completed states.

Furthermore, as shown in FIG. 4, in the number-of-turns area 35, information ("1/5" in FIG. 4) indicating the current number of turns and the number of turns (here, 5) at which the competitive game is ended, is displayed. The terminal apparatus 2*a* updates and displays the above information at a timing when a new turn is started. The number-of-turns area 35 notifies the user of the current number of turns.

In the exemplary embodiment, a team to be a first mover (i.e., a team to which a first move is given) at start of a turn is determined as follows, for example.

First, a team to be the first mover in the first turn may be determined according to a predetermined rule, or at random (by using a random number, for example). In the exemplary embodiment, the information processing system determines a team to be the first mover, based on the content of the competitive game previous to the current competitive game. Specifically, the information processing system determines, as a team to be the first mover, a team, of the two teams, which has more frequently become a second mover in succession in the previous competitive game than the other team. If the frequency is equal between the two teams, the information processing system determines, as a team to be the first mover, a team, of the two teams, which has more frequently become the second mover in the past five competitive games than the other team. If the frequency is equal between the two teams, the information processing system determines a team to be the first mover at random. In the exemplary embodiment, information regarding the contents of the competitive games of the respective users (including the information of the frequencies described above) is stored in the server 1.

Next, a team to be the first mover in the second and subsequent turns is determined based on the progress results in the previous turns in the current competitive game. Specifically, the information processing system determines, as the first mover in the current turn, a team, of the two team, which has had the less number of moves in the previous turn than the other team. That is, a team, for which the less number of moves have been set in the previous turn than the opponent team because the second condition or the third condition has been satisfied in the previous turn, becomes the first mover in the current turn. For example, in the example shown in FIG. 5, since the number of moves of the enemy army team (specifically, 1) is less than the number of moves of the own army team (specifically, 6) in the second turn, the enemy army team is the first mover in the third turn. By determining the first mover and the second mover as described above, it is possible to avoid a situation that only one team unconditionally continues to be the first mover, and the fairness of the game is ensured.

When the two teams have the same number of moves in the previous turn, the information processing system determines, as the first mover, a team having been the first mover in the previous turn (i.e., the relationship of the first mover and the second mover in the previous turn is maintained). In another embodiment, in the above case, the information processing system may determine, as the first mover, a team different from the team having been the first mover in the previous turn. There is no limitation on the method for determining a team to be the first mover. In another embodiment, a determination method different from that of the exemplary embodiment may be adopted.

As described above, in the exemplary embodiment, each time a turn has ended and a new turn is started (i.e., each time the progress state of the competitive game satisfies the turn end condition), the information processing system sets any one of the teams in the operable state (specifically, the first operable state in the turn; in other words, a team to be the first mover), based on the progress result of the competitive game until the turn end condition is satisfied (specifically, based on the number of moves in the previous turn). Thus, a team to be the first mover is determined according to the progress state of the competitive game so far, thereby avoiding the situation that one team unconditionally continues to be the first mover. The phrase "setting any one of the teams in the operable state, based on the progress result of the competitive game" also includes a case where a team having the larger number of moves in the previous turn is determined as the first mover (i.e., a team having the less number of moves is determined as the second mover), in addition to the case where a team having the less number of moves in the previous turn is determined as the first mover as in the exemplary embodiment. That is, in another embodiment, in a competitive game in which a team to be the second mover at start of a turn will take advantage over a team to be the first mover, a team having the larger number of moves in the previous turn may be set to be the first mover in the current turn.

In the exemplary embodiment, assuming that a period from start of the competitive game or from when the turn end condition is satisfied with the competitive game end condition being not satisfied to when the turn end condition is satisfied next time, is a unit time (specifically, 1 turn), the information processing system determines a team to be set in the operable state first in the unit time (i.e., a team to be the first mover). Furthermore, when a skip condition (specifically, the second condition or the third condition described above) has been satisfied for a certain team during a unit period, the information processing system does not set the certain team in the operable state during the unit period even if the number of times this team has been set in the operable state is less than the upper limit number of moves. Then, the information processing system determines a team which has been set in the operable state the least number of times (i.e., which has been given the smallest number of moves) in the previous unit period, as a team to be set in the operable state first in the current unit period. In this case, a team having the less number of moves in the previous turn becomes the first mover in the current turn. Since a team having the larger number of moves in the previous turn has been consecutively given moves at the end of the previous turn, if this team is determined as the first mover in the current turn, a move is further given to this team, which may result in a possibility that this team takes an excessive advantage. In contrast, in the exemplary embodiment, since the team having the less number of moves in the previous turn is determined as the first mover in the current turn, the above possibility is reduced, thereby ensuring the fairness of the game.

When a game end condition has been satisfied, the information processing system ends the competitive game. In the exemplary embodiment, the game end condition is that at least one of: a condition that all the characters included in any one team have disappeared; and a condition that five turns have elapsed, is satisfied. That is, even before five turns elapse, the information processing system ends the competitive game according to that all the characters in any one team have been defeated. Even when not all the characters in each team have been defeated, the information processing system ends the competitive game according to that five turns have elapsed.

As described above, in the exemplary embodiment, the information processing system determines that the game end condition has been satisfied when the turn end condition has been satisfied a predetermined number of times (specifically, 5 times). Thus, since the competitive game is ended even when not all the characters in each team are defeated, it is possible to reduce the possibility that the competitive game becomes too long.

[2-2. Method for Determining Winner and Loser in Competitive Game]

In the exemplary embodiment, the information processing system determines a winner and a loser in the competitive game when the competitive game has ended. Specifically, when the competitive game has ended because all the characters in any one team have been defeated, this team is a loser, and the other team is a winner. When the competitive game has ended because five turns have elapsed, a winner and a loser are determined based on the scores, of the respective teams, calculated during the competitive game.

In the exemplary embodiment, the information processing system calculates a defeat score and a conquest score as scores for determining a winner and a loser in the competitive game. Hereinafter, methods for calculating the respective scores will be described.

The defeat score is a score that is increased when a character of a team has defeated (i.e., disappeared) a character of an opponent team through a battle during the competitive game. In the exemplary embodiment, 2 points are added to the defeat score of the ally team each time one character has been defeated. Furthermore, when the aforementioned captain character has defeated a character of the opponent team, 1 point is further added as an additional bonus to the defeat score of the ally team, in addition to the 2 points. Moreover, when a character has defeated the captain character of the opponent team, 1 point is further added as an additional bonus to the defeat score of the ally team, in addition to the 2 points. When the captain character has defeated the captain character of the opponent team, both the two types of bonuses described above are added, so that 4 points in total are added to the defeat score of the ally team. There is no limitation on the specific method for calculating the defeat score. In another embodiment, the defeat score may be increased through any calculation method according to that a character has defeated an opponent character.

As shown in FIG. 4, the game image includes an own army defeat score image 41 representing the defeat score of the own army team, and an enemy army defeat score image 42 representing the defeat score of the enemy army team. The terminal apparatus 2*a* updates the content of the own army defeat score image 41 according to the defeat score of the own army team being updated, and updates the content of the enemy army defeat score image 42 according to the defeat score of the enemy army team being updated. The defeat score images 41 and 42 notify the user of the current defeat scores of the respective teams.

The conquest score is a score that is increased based on placement of characters in a conquest area 39 set in the game space 31 (see FIG. 4). In the exemplary embodiment, as shown in FIG. 4, the conquest area 39 is set in the game space 31. The conquest area 39 is an area that is located in the center of the game space 31 and has a size of vertical 4 squares×horizontal 6 squares.

In the exemplary embodiment, the conquest score is increased based on the number of characters of each team included in the conquest area 39. Specifically, when the number of characters of one team included in the conquest area 39 at the end of a turn is two or more larger than the number of characters of the other team in the conquest area 39, 2 points are added to the conquest score of the one team. When the number of characters of one team included in the conquest area 39 at the end of the turn is less than two larger than the number of characters of the other team in the conquest area 39, the conquest score is not increased for either team.

Figure 6:
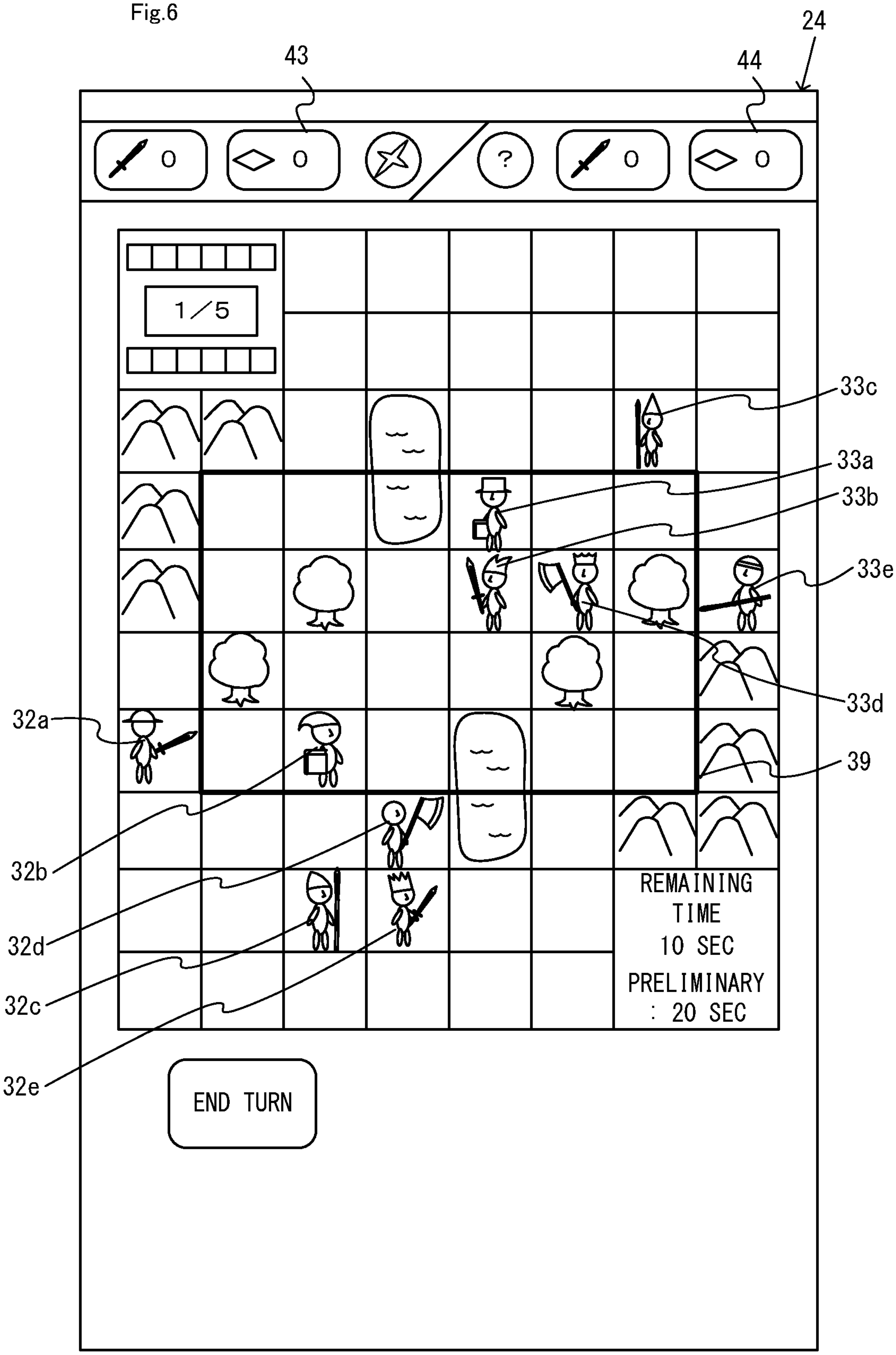
FIG. 6 shows an example of a game image in which characters are placed in a conquest area at the end of a turn.

FIG. 6 shows an example of a game image in the case where characters are placed in the conquest area at the end of a turn. In the example shown in FIG. 6, at the end of the first turn, one own army character 32*b* of the own army team is placed in the conquest area, and three enemy army characters 33*a*, 33*b*, and 33*d* of the enemy army team are placed in the conquest area. In this case, the information processing system adds 2 points to the conquest score of the enemy army team. There is no limitation on the specific method for calculating a conquest score. In another embodiment, the conquest score may be increased through any calculation method based on that a character has been placed in the conquest area. For example, the conquest score may be increased according to the number of characters placed in the conquest area at the end of a turn. Alternatively, the conquest score may be increased when a character has entered the conquest area 39, not only at the end of a turn.

As shown in FIG. 4 and FIG. 6, the game image includes an own army conquest score image 43 representing the conquest score of the own army team, and an enemy army conquest score image 44 representing the conquest score of the enemy army team. The terminal apparatus 2*a* updates the content of the own army conquest score image 43 according to the conquest score of the own army team being updated, and updates the content of the enemy army conquest score image 44 according to the conquest score of the enemy army team being updated. The conquest score images 43 and 44 notify the user of the current conquest scores of the respective teams.

As described above, in the exemplary embodiment, by setting the conquest score, it is possible to motivate the user to move characters into the conquest area in the competitive game. When the enemy army team is operated by the information processing system, characters of the enemy army team are operated with an algorithm that aggressively moves the characters toward the conquest area. Therefore, a situation in which the characters of the two teams battle each other in the conquest area is more likely to occur, and a stalemate in which the characters of the two teams do not battle while keeping a distance from each other is less likely to occur. Thus, the entertainment characteristics of the competitive game can be improved.

In the exemplary embodiment, as shown in FIG. 4, the initial positions of the characters in the respective teams at the start of the competitive game are outside the conquest area 39. That is, at the start of the competitive game, the information processing system places the characters included in the respective team at positions inside the game space 31 and outside the conquest area. Therefore, advantage/disadvantage between the teams with respect to the conquest area is unlikely to occur at the start of the competitive game, whereby the fairness of the game can be ensured. The user may be allowed to designate the initial positions of the characters of the own team, within a predetermined range outside the conquest area 39. For example, in the example shown in FIG. 4, the user of the terminal apparatus 2*a* may be allowed to change the initial positions of the own army characters 32*a* to 32*e* by exchanging the positions of any two characters.

In the exemplary embodiment, the information processing system sets the positional relationship between the initial placement positions of the characters and the conquest area 39 so as to be uniform for the respective teams (see FIG. 4). Thus, the fairness at the start of the competitive game can be further ensured.

In the exemplary embodiment, the conquest area 39 is an area including the center portion of the game space 31.

Therefore, advantage/disadvantage between the teams is less likely to occur with respect to the condition (e.g., distance) for movement of each character to the conquest area, whereby the fairness of the game can be ensured.

In the case where a winner and a loser in the competitive game are determined based on the scores of the teams, the information processing system calculates, for each team, a sum of the defeat score and the conquest score at the end of the competitive game. The information processing system determines a team having the larger sum as a winner, and a team having the smaller sum as a loser. Thus, it is possible to determine a winner and a loser in the competitive game even when not all the characters included in a team are defeated.

In another embodiment, other types of scores may be used for determining a winner and a loser in the competitive game, instead of (or in addition to) the defeat score and the conquest score. For example, the information processing system may use, for determining a winner and a loser in the competitive game, a score based on a damage given to a character of the opponent team during the competitive game, or a score based on a hit point value of each character of the ally team at the end of the competitive game.

[2-3. Captain Character]

Next, a captain character will be described. In the exemplary embodiment, a captain skill is set for a captain character. The captain skill is, for example, a skill having a content different from the contents of the skills possessed by the respective characters (including the special skills described above). In the exemplary embodiment, multiple types of captain skills are prepared. When designating a captain character in advance of the competitive game, the user can select a captain skill to be given to the captain character from among the multiple types of captain skills prepared. In another embodiment, only one type of captain skill may be prepared.

As described above, in the exemplary embodiment, a plurality of characters included in a team include one character that is designated by the user as a captain character having a predetermined skill (i.e., captain skill) different from skills possessed by the other characters in the team. In this case, strategic characteristics reside in selecting the captain character from among the plurality of characters used in the competitive game, whereby the information processing system can provide a highly strategic competitive game. Moreover, since a character is strengthened when becoming a captain character, the user can make his/her favorite character more active in the competitive game by selecting the favorite character as a captain character.

There is no limitation on the specific contents of the captain skills (i.e., the effects of the skills). In the exemplary embodiment, the multiple types of captain skills described above include an area shifting skill having an effect of shifting the conquest area during the competitive game. In the exemplary embodiment, each captain skill is a skill that is automatically exercised according to an exercitation condition being satisfied, even if the user does not perform an instruction input to exercise the skill. In another embodiment, like the special skills described above, each captain skill may be a skill that is exercised when the user has performed an instruction input to exercise the skill.

Figure 7:
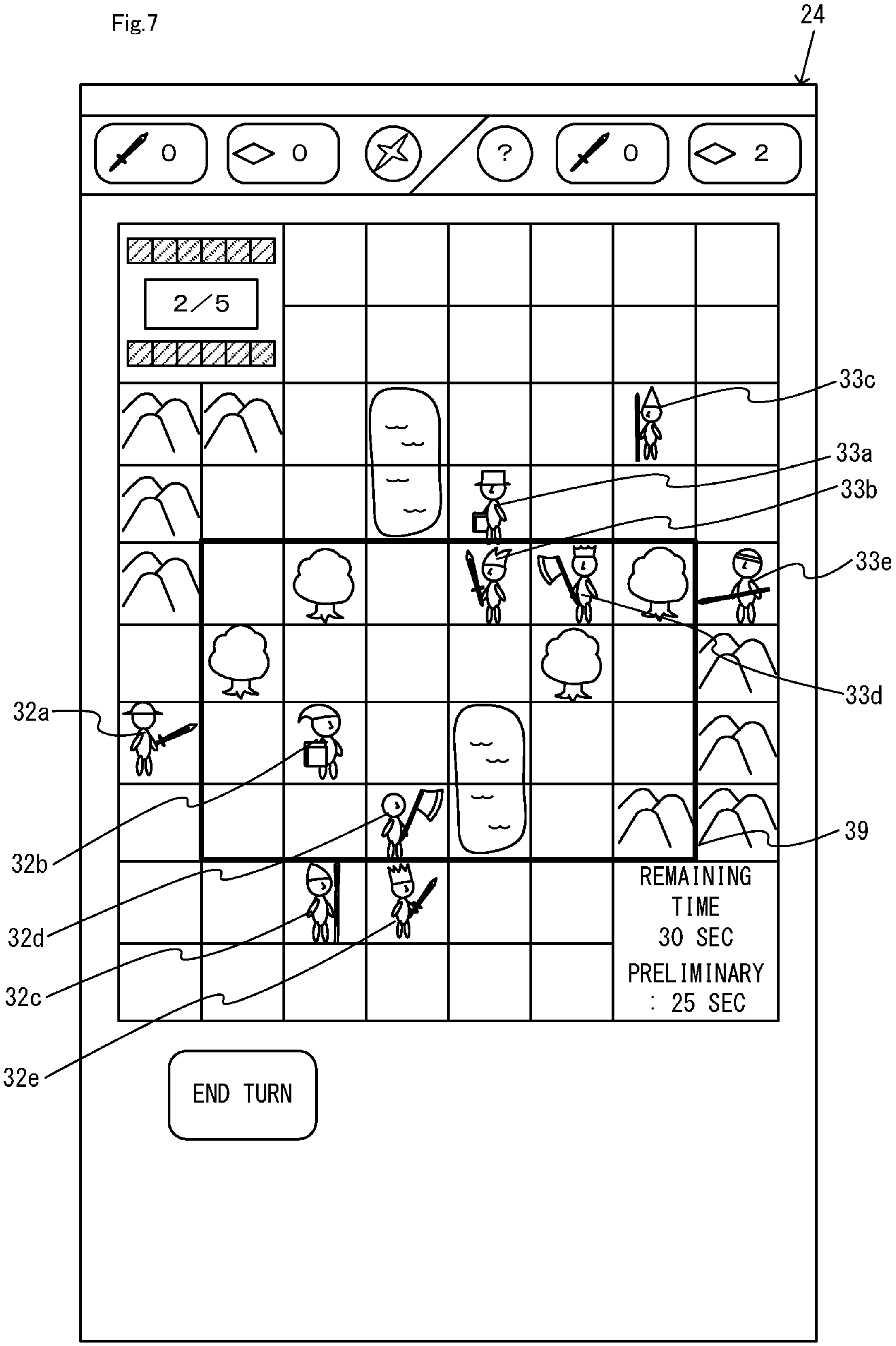
FIG. 7 shows the game image after the conquest area has been shifted in the non-limiting competitive game.

FIG. 7 shows a game image after a conquest area has been shifted in the competitive game. The game image shown in FIG. 7 represents a state where the conquest area 39 has been shifted from the state of the game image shown in FIG. 6. In FIG. 7, the conquest area 39 has been shifted downward by one square from the state shown in FIG. 6.

In the exemplary embodiment, when the area shifting skill has been exercised, the conquest area 39 is shifted. In the exemplary embodiment, an area shifting skill exercitation condition is, for example, that the captain character is located in the conquest area 39 at the start of any turn from the second turn to the fourth turn. In the example shown in FIG. 7, the own army character **32*b* is the captain character. Since the captain character is located in the conquest area 39 in the state at the end of the first turn shown in FIG. 6, the above condition is satisfied in the state at the start of the second turn shown in FIG. 7. Therefore, the area shifting skill is exercised, and the conquest area 39** is shifted. There is no limitation on the condition for exercising the area shifting skill, and another condition may be adopted. In another embodiment, this condition may be that the user performs an instruction input to exercise the skill, for example.

In the exemplary embodiment, when the area shifting skill has been exercised, the information processing system shifts the conquest area 39 by a predetermined distance (here, one square) in a direction that is advantageous for the team to which the captain character equipped with the area shifting skill belongs. Specifically, the "direction that is advantageous for the team" is a direction approaching the initial positions of the characters included in the team. This makes each character in the team to which the captain character belongs, easy to enter the conquest area 39, whereby the competitive game can be progressed advantageously for the team. In the example shown in FIG. 7, the conquest area 39 is shifted downward by one square at the start of the second turn. As a result, as for the own army team, the own army character **32*d* as well as the own army character 32*b* are in the conquest area 39, whereas, as for the enemy army team, the enemy army character 33*a* is outside the conquest area 39 and only the enemy army characters 33*b* and 33*d* are inside the conquest area 39. That is, the conquest area 39** having been shifted is advantageous for the own army team. In another embodiment, the "direction that is advantageous for a team" is not limited to the above direction. For example, the direction may be a direction approaching the current positions of the characters included in the team, or a direction that causes the characters of the opponent team to be absent in the conquest area.

In a case where the captain characters of both the teams are equipped with the area shifting skill and the area shifting skills of the captain characters are exercised, since the effects of the area shifting skills are offset, the conquest area 39 is not shifted.

The captain skill can be exercised during a period when the captain character equipped with the captain skill is present in the game space 31. Therefore, when the captain character has disappeared through a battle, the captain skill of the captain character is not exercised.

As described above, in the exemplary embodiment, the information processing system changes the position of the conquest area 39 in the game space, according to a predetermined skill (i.e., area shifting skill) possessed by a character being exercised. Thus, since the conquest area 39 is shifted during the competitive game, the strategic characteristics of the competitive game can be improved. The "predetermined skill" having the effect of shifting the conquest area 39 is not limited to the area shifting skill that is an example of the captain skill, and may be a skill of a type different from the captain skill (i.e., a skill possessed by a character that is not a captain character).

In the exemplary embodiment, as shown in FIG. 4, the game image includes an own army captain skill image 45 representing the type of the captain skill of the own army, and an enemy army captain skill image 46 representing the type of the captain skill of the enemy army. In the example shown in FIG. 4, the captain skill images 45 and 46 are icons representing the types (or contents) of the captain skills.

In the exemplary embodiment, the own army captain skill image 45 is an icon representing the type of the captain skill, from the start of the competitive game. Meanwhile, in the example shown in FIG. 4, the enemy army captain skill image 46 is an icon (icon of "?" in FIG. 4) representing that the type of the captain skill is unknown. In the exemplary embodiment, when an enemy army skill has been exercised during the competitive game, the terminal apparatus 2*a* updates the enemy army captain skill image 46 so as to be an icon representing the type of the corresponding captain skill. Therefore, in the exemplary embodiment, the user of the terminal apparatus 2*a* cannot know the content of the captain skill of the enemy army, and can check the content of the skill by the enemy army captain skill image 46 after the captain skill of the enemy army has been exercised. According to the exemplary embodiment, the content of the captain skill is hidden from the opponent team before exercitation of the skill, whereby the strategic characteristics of the competitive game can be improved. After exercitation of the skill, the enemy army captain skill image 46 allows the user to easily check the content of the captain skill.

In the exemplary embodiment, each of the characters possessed by the user is associated with a character point. When a character possessed by the user has been used as a captain character in the competitive game, the information processing system adds the character point of the character. The value of the character point to be added is determined based on the result and/or the content of the competitive game. Specifically, regarding the character point of the captain character in the team that has won the competitive game, the information processing system adds 10 points as a win bonus, and a sum of the defeat score and the conquest score in the competitive game. Meanwhile, regarding the character point of the captain character in the team that has lost the competitive game, the information processing system adds a sum of the defeat score and the conquest score in the competitive game. As described above, in the exemplary embodiment, since the user can get more character points when having won the competitive game, motivation to win the competitive game can be given to the user. Since the user can get the character point even when having lost the competitive game, motivation to play the competitive game can be given to the user.

In another embodiment, there is no limitation on the character point calculation method. For example, the character point may be calculated based on only the result of the competitive game (e.g., having won the competitive game), or the character point may be added based on only the content of the competitive game (e.g., the sum of the defeat score and the conquest score).

In the exemplary embodiment, the information processing system gives a reward to the user, based on the character point of a character possessed by the user. There is no limitation on the content of the reward. In the exemplary embodiment, the reward is, for example, a reward in the game application of the competitive game, and more specifically, is an item, currency, or a point that is available in the game application.

In the exemplary embodiment, the information processing system gives a reward to the user, based on the character point, of a character, which is the highest among the character points of one or more characters possessed by the user. Specifically, each time the character point of the character reaches a predetermined reference value (e.g., a multiple of 100), the information processing system gives a reward according to the reached reference value to the user. There is no limitation on the condition for giving a reward based on the character point. For example, in another embodiment, the information processing system may give a reward to the user, based on a sum of the character points of the characters possessed by the user.

As described above, in the exemplary embodiment, based on the result and/or the content of the competitive game, the information processing system calculates the value of a parameter (i.e., character point) associated with a character used as a captain character in the competitive game. Then, based on the parameter associated with the character, the information processing system gives a reward to the user who possesses the character. Thus, the information processing system can motivate the user to play the competitive game. Since the character point is calculated for each character, the user can increase the character point of his/her favorite character by performing the competitive game with the favorite character being used as a captain character. That is, in the exemplary embodiment, the information processing system can motivate the user to perform the competitive game by using his/her favorite character.

In the exemplary embodiment, the information processing system presents, to the users, ranking regarding a character in the competitive game. Specifically, the information processing system ranks the users with respect to the character point of a single character, and presents the ranking of the users. In the exemplary embodiment, it is assumed that there is a case where a plurality of users possess the same character. In this case, the character point of this character is set for each user. Therefore, the character point regarding a certain character varies among the users. In the exemplary embodiment, the information processing system ranks the users in descending order of the character points of the single character, and presents the ranking to the users. In ranking the users, if there are a plurality of users having equal character points of the character, the information processing system may rank the users, based on the result (e.g., the number of wins) in the competitive game in which this character is used as a captain character.

Specifically, the server 1 stores therein the character points of each character for the respective users. Then, for example, upon receiving a request from the terminal apparatus 2*a*, the server 1 performs the aforementioned ranking for a character designated by the terminal apparatus 2, and transmits ranking information indicating the ranks of the users to the terminal apparatus 2*a*. The terminal apparatus 2*a* displays the ranking information received from the server 1 on the display section 24. As described above, in the exemplary embodiment, the information processing system can generate, for each character, ranking of the users based on the result of the competitive game, and present the ranking to the users. By presenting such ranking to the users, the information processing system can motivate the users to perform the competitive game by using their favorite characters.

In another embodiment, the information processing system may give rewards to the users, based on the ranking. For example, the information processing system may give, to each user, a reward based on the rank of the user in the ranking.

[2-4. Game Mode in Competitive Game]

Next, game modes in the competitive game will be described. In the exemplary embodiment, the competitive game includes multiple types of game modes. Specifically, the competitive game includes three types of game modes, i.e., a free battle mode, a first-rate battle mode, and a second-rate battle mode. Hereinafter, the respective game modes will be described.

[2-4-1. Free Battle Mode]

The free battle mode is a game mode in which matching of users who participate in the competitive game is performed without using rates that are used in the first-rate and second-rate battle modes. In the exemplary embodiment, each of the rate battle modes is a game mode in which a rate is set for each user and a purpose of the game is to increase the rate and a rank based on the rate, whereas the free battle mode is a game mode in which each user can enjoy the competitive game without worrying about such rates. In the exemplary embodiment, in the free battle mode, the user is allowed to designate a condition for matching in the competitive game, and settings (specifically, rules, etc.) of the competitive game.

When the competitive game is performed in the free battle mode, each terminal apparatus 2 transmits, to the server 1, a request for matching with another user to be an opponent (hereinafter referred to as "matching request"). Upon receiving such matching requests from terminal apparatuses 2, the server 1 performs matching for each of the users of the terminal apparatuses 2 that have transmitted the matching requests (i.e., the server 1 determines two users who will participate in the competitive game from among the users). Then, the competitive game is performed by the two users selected through the matching.

Figure 8:
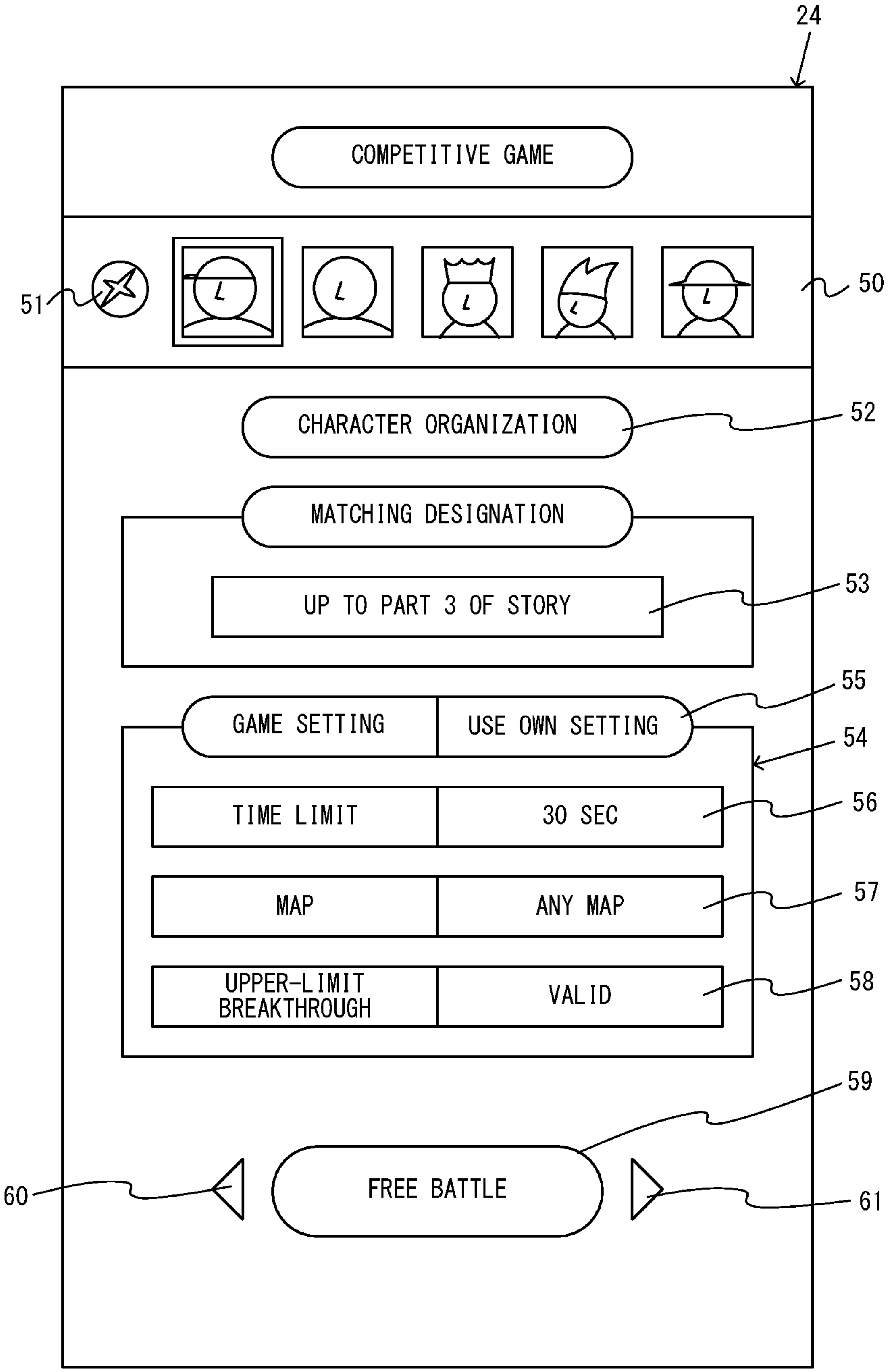
FIG. 8 shows an example of a setting image that is displayed on a non-limiting terminal apparatus when a matching request is transmitted.

FIG. 8 shows an example of a setting image displayed on a terminal apparatus 2 when the terminal apparatus 2 transmits a matching request. For example, the setting image shown in FIG. 8 is displayed on the display section 24 when the user has made a competitive game execution instruction on a predetermined menu screen, during execution of the game application in the terminal apparatus 2.

The setting image shown in FIG. 8 includes a use character area 50. In the use character area 50, use character images indicating a plurality of (five) characters (hereinafter referred to as "use characters") to be used in the competitive game, and a captain skill image 51, are displayed. In FIG. 8, the leftmost use character, of the five use character images, is a captain character. The captain skill image 51 represents a captain skill set for the captain character. The captain skill image 51 is, for example, an icon indicating the type of the captain skill, similar to the captain skill images 45 and 46 described above.

The setting image shown in FIG. 8 includes a formation instruction button image 52. The formation instruction button image 52 is a button image for the user of the terminal apparatus 2 to perform a formation instruction regarding use characters. That is, when an input of designating the formation instruction button image 52 has been performed by the user, the information processing system displays, instead of the setting image, a formation image (not shown) for setting of use characters. The formation image includes a list of characters possessed by the user, and the terminal apparatus 2 receives an input of designating a character to be set as a use character one by one from among the listed characters. By performing this input, the user can change the use character displayed in the use character area 50 in the setting image. When the setting image is displayed, a list of captain skills is displayed in response to an input designating the captain skill image 51, and the terminal apparatus 2 receives an input designating a captain skill to be set for the captain character from among the listed captain skills. By performing this input, the user can change the captain skill set for the captain character. The use character setting method and the captain skill setting method described above are examples, and there is no limitation on the user interface for the user to set and/or change a use character and a captain skill.

The setting image shown in FIG. 8 includes a matching condition image 53 that represents a matching condition designated by the user. The matching condition is a condition when the server 1 performs matching in the competitive game, and the matching is performed so as to satisfy the matching condition. In the example shown in FIG. 8, a condition "up to part 3 of story" is displayed. This condition means that "the use character should be a character that appeared up to part 3 of the story of a story game included in the game application". As will be described in detail below, in the exemplary embodiment, when a matching condition is designated, a user corresponding to a team that is composed of use characters satisfying the matching condition is set as an opponent user.

In the exemplary embodiment, the game application includes a story game in which a story is progressed and which is different from the competitive game. The story game is a game in which a user who wins the game can progress the story. The story game is a game using characters possessed by the user, like the competitive game. However, there is no limitation on the specific content of the game, and the genre and the rules of the story game may be different from those of the competitive game. Moreover, the story is divided into a plurality of parts (or chapters), and each character that appears in the game application appears in at least one of the parts of the story.

In the exemplary embodiment, a new part is added to the story by updating the game application. That is, each part of the story uniquely corresponds to any of versions of the game application. Meanwhile, each character is associated with version information indicating the version of the game application corresponding to the character, as a parameter of the character. The "version of the game application corresponding to the character" is the version in which the character appeared for the first time, in other words, the version corresponding to the part of the story in which the character appeared for the first time. Therefore, in the exemplary embodiment, the part of the story in which the character appears can be specified by the version information associated with the character. That is, in the exemplary embodiment, determination as to whether or not each use character satisfies the matching condition can be performed by using the version information associated with the use character.

In the state where the setting image is displayed, the terminal apparatus 2 receives an input of designating the matching condition image 53. By performing this input, the user can change the matching condition indicated by the matching condition image 53. Specifically, the terminal apparatus 2 displays a list of options of matching conditions in response to the above input, and receives an input of designating one of the options. In the exemplary embodiment, each option is a condition that designates the number of parts of the story, such as "up to part 3 of story", "up to part 4 of story", or the like (i.e., designates the number of parts in which a character that is allowed to be used in the competitive game appears). The user can change the matching condition that the user designates, by designating one of the options. That is, in the exemplary embodiment, it can be said that a parameter that the user can designate as a matching condition is a value according to the number of parts of the story. In the exemplary embodiment, the options include an option indicating "undesignated", and the user does not designate a matching condition by selecting this option.

As described above, in the exemplary embodiment, the character parameter (specifically, version information) used for determining a matching condition indicates a value according to the version corresponding to the character among the versions of the game application. Therefore, the user can perform the competitive game on the condition that a character corresponding to a specific version is used as a use character.

In a game application in which version update is repeated and new characters appear according to the version update, there is a general tendency that a newer character is stronger (i.e., has an advantageous ability in the game). Therefore, by using a matching condition regarding version information associated with a use character as in the exemplary embodiment, the user can exclude, from opponents, a user who uses a new and strong character as a use character, for example. Thus, the user can adjust the strength of an opponent team. Moreover, for example, even in a case where the user uses, in the competitive game, his/her favorite character that has appeared in an early version (i.e., tends to have lower ability than a newly appearing character), the user is prevented from being put at a disadvantage by designating a matching condition. Therefore, even in the above case, it is possible to motivate the user to perform the competitive game by using his/her favorite character.

It can be said that the version information is information indicating a value according to the time when the corresponding character has become usable in the game application. The character parameter used for determining a matching condition may be information indicating a value according to the time. For example, the character parameter may be not only the version information but also information indicating the date (year, month, day) when the character has become usable in the game application. Even when the character parameter is information indicating the time, the same effects as in the exemplary embodiment can be achieved.

It can be said that each of the games performed in the respective parts of the story of the story game is a game different from the competitive game. It can also be said that the version information associated with each character is information indicating a value according to a game, of the above games, in which the character appears. The character parameter used for determining a matching condition may be information as described above (i.e., information indicating a game, of the games different from the competitive game, in which the character appears). For example, the character parameter may be not only the version information but also information indicating an identification number (e.g., a number assigned for each story) of a game in which the character appears. Even when the character parameter is such information, the same effects as in the exemplary embodiment can be achieved.

It can also be said that the version information is information indicating a value according to a group to which a character belongs. In another embodiment, the character parameter used for determining a matching condition may be information indicating a group to which the corresponding character belongs. This group may be one of groups into which characters are divided based on the properties and/or the abilities thereof, such as the soldier types (e.g., walking soldiers, cavalries, etc.) of the characters, weapons with which the characters are equipped, the attributes of the characters (e.g., fire, water, etc.), skills possessed by the characters, items possessed by the characters, and the like. Moreover, in a case where each character that appears in the game application is a character that appears in any of a plurality of other game applications different from the game application (i.e., when each character that appears in the game application is based on a character that appears in any of the plurality of other game applications), the group may be a group of the other game application. In another embodiment, the information processing system may receive an input of designating a condition regarding a group as described above, as a matching condition from the user. By using the matching condition regarding the group, the user can perform a battle between teams including use characters that belong to a specific group, whereby the user can play the competitive game in more ways of enjoyment.

The setting image shown in FIG. 8 includes a game setting area 54. The game setting area 54 is an area where information regarding game settings, in the competitive game, designated by the user (e.g., settings regarding rules used in the competitive game) is displayed. In the exemplary embodiment, in the game setting area 54, a priority setting image 55, a designated time limit image 56, a designated map image 57, and a designated upper limit image 58 are displayed. By designating the information represented by any of the images 55 to 58, the user can designate game setting that the user desires to use in the competitive game.

The designated time limit image 56 represents information regarding the aforementioned time limit in the competitive game. Specifically, the designated time limit image 56 represents an initial value ("30 seconds" in FIG. 8) of the aforementioned move remaining time. In the exemplary embodiment, the user can select an initial value of the move remaining time that the user designates, from among a plurality of options prepared in advance. For example, the terminal apparatus 2 displays a list of the options of the initial value in response to an input of designating the designated time limit image 56. When the user has selected one option from the list, the terminal apparatus 2 changes the content represented by the designated time limit image 56 to the selected content.

The information regarding the time limit that the user can designate is not limited to the move remaining time. For example, in another embodiment, the information processing system may allow the user to designate presence/absence of the preliminary time and/or the preliminary time calculation method, in addition to (or instead of) the move remaining time.

The designated map image 57 represents information regarding maps of the game space used in the competitive game. In the exemplary embodiment, multiple types of maps having different terrains are prepared for the game space in the competitive game. In the exemplary embodiment, the characters are classified into multiple types of soldiers, and the respective soldier types have different conditions for moving on the terrains of the maps. For example, a cavalry can move more than a walking soldier on squares corresponding to a plain terrain but cannot enter squares corresponding to a forest terrain. A flying soldier can enter squares corresponding to a mountain terrain where the other soldiers cannot enter. Therefore, the user can advantageously progress the competitive game by designating a map that is suitable for the characteristics of the soldier type of the own use character.

In the exemplary embodiment, the user can select a map that the user designates, from among a plurality of options prepared in advance. For example, the terminal apparatus 2 displays a list of the options of maps in response to an input of designating the designated map image 57. When the user has selected one option from the list, the terminal apparatus 2 changes the content represented by the designated map image 57 to the selected content. In the exemplary embodiment, the options also include an option of "any map" indicating that the user does not designate a map (see FIG. 8).

The designated upper limit image 58 represents information regarding whether upper limit breakthrough of the use character is valid or invalid. In the exemplary embodiment, an upper limit level (e.g., 40) is set for each character, and an ability value (e.g., attack power or defense power) of the character can be further increased by further raising the upper limit level (i.e., by breaking through the upper limit) under a predetermined condition. In the case where upper limit breakthrough of the use character is valid in the game setting of the competitive game, the competitive game is performed such that the character having broken though the upper limit has the ability value raised by the breakthrough. Meanwhile, in the case where upper limit breakthrough of the use character is invalid, the competitive game is performed such that even the character having broken through the upper limit does not have the ability value raised by the breakthrough but has the ability value at the upper limit level.

In the exemplary embodiment, the user can designate whether upper-limit breakthrough of the use character is valid or invalid. For example, the terminal apparatus 2 displays options, "valid" and "invalid", in response to an input of designating the designated upper limit image 58. When the user has selected one of the options, the terminal apparatus 2 changes the content indicated by the designated upper limit image 58 to the selected content.

If a user (e.g., a beginner user) who does not possess a character having broken through the upper limit performs the competitive game with a user (e.g., an expert user) who possesses many characters having broken through the upper limit, the former user is likely to be put at a disadvantage in the competitive game because this user is inferior in the strength of the use character itself. In this regard, in the exemplary embodiment, since the user can designate whether upper limit breakthrough of the use character is valid or invalid, the user can perform the competitive game with the strength of the use character itself being in the same condition as that of the opponent.

The priority setting image 55 represents priority setting information indicating whether a user who designates game setting to be used in the competitive game is the user himself/herself or the opponent. The priority setting information indicates which game setting is to be used in the competitive game, the game setting designated in the game setting area 54 (i.e., the game setting represented by the images 56 to 58) or the game setting designated by the opponent. Specifically, in the priority setting image 55, the priority setting information, in the former case, is a message indicating "use own setting" that represents the user himself/herself. In the latter case, the priority setting information is a message indicating "leave it up to opponent" that represents the opponent. When the priority setting image 55 indicates the opponent, the contents indicated by the images 56 to 58 may not necessarily be displayed. In the exemplary embodiment, the terminal apparatus 2 displays options, "use own setting" and "leave it up to opponent", in response to an input designating the priority setting image 55. When the user has selected one of the options, the terminal apparatus 2 changes the content indicated by the designated upper limit image 58 to the selected content.

As described above, the user can designate whether or not to use, in the competitive game, the game setting designated in the game setting area 54. If the game setting is left to be designated by the user without providing the items under the priority setting image 55, matching in the competitive game becomes difficult to be determined, and takes time. In contrast, in the exemplary embodiment, since the option of using the game setting designated by the opponent in the competitive game is added, the information processing system can smoothly perform the matching.

There is no limitation on the specific content of the game setting that the user can designate in the game setting area 54. In another embodiment, information of the game setting that the user can designate in the game setting area 54 may not necessarily include the information represented by the images 56 to 58, and may include information different from the above information. In another embodiment, the terminal apparatus 2 may allow the user to designate, as information of game setting, information regarding the number of use characters participating in the competitive game, information regarding the number of turns in the competitive game, information regarding the conquest area in the game space (e.g., the position and/or the size of the conquest area), or the like, for example.

The setting image shown in FIG. 8 includes a start button image 59. The start button image 59 is a button image for the user of the terminal apparatus 2 to perform a matching start instruction. That is, when an input of designating the start button image 59 is performed by the user, the terminal apparatus 2 transmits, to the server 1, a matching request based on the matching condition and the game setting designated at that time. Specifically, the terminal apparatus 2 transmits, to the server 1, the matching request including information regarding the user of the terminal apparatus 2 (e.g., ID or the like of the user), information of the use character and the captain skill, information of the matching condition, information of the game setting, and information indicating the game mode of the competitive game (specifically, information indicating the free battle mode). As will be described in detail below, when an opponent user has been determined through matching performed in the server 1 that has received the matching request, the terminal apparatus 2 starts the competitive game in the free battle mode.

In the exemplary embodiment, even when a matching start instruction has been performed, if the use character designated at that time (i.e., the use character displayed in the use character area 50) does not satisfy the designated matching condition (i.e., the matching condition represented by the matching condition image 53), the terminal apparatus 2 does not transmit a matching request. The reason is as follows. In the above case, since the use character of the user does not satisfy the matching condition requested to the opponent, if matching is performed in this case, this matching is likely to be disadvantageous for the opponent user. In the above case, the terminal apparatus 2 notifies the user that the use character does not satisfy the matching condition, or performs a notification that urges the user to designate a use character or a matching condition again.

In another embodiment, determination as to whether or not the designated use character satisfies the designated matching condition may be performed by the server 1 instead of the terminal apparatus 2. For example, even when the designated use character does not satisfy the designated matching condition, the terminal apparatus 2 transmits a matching request, and the server 1 may not perform matching based on this matching request.

The setting image shown in FIG. 8 includes switch button images 60 and 61. Each of the switch button images 60 and 61 is a button image for the user to perform a switch instruction for switching the mode of the competitive game. That is, when an input of designating the switch button image 60 or 61 has been performed by the user, the terminal apparatus 2 switches the setting image to be displayed on the display section 24, from the setting image for the free battle mode to the setting image for another mode (i.e., the first or second rate battle mode). In response to an input of designating the switch button image 60, the terminal apparatus 2 switches and displays the setting images of the three modes in a predetermined order. In response to an input of designating the switch button image 61, the terminal apparatus 2 switches and displays the setting images of the three modes in an order reverse to the predetermined order. Although not shown in FIG. 8, the setting image in each rate battle mode includes a user interface for the user to designate a use character to be used in the battle mode.

Upon receiving the above matching request, the server 1 executes a matching process of determining users, who participate in the competitive game, including a user of the terminal apparatus 2 having transmitted the matching request and another user to be an opponent. In the exemplary embodiment, the server 1 performs, based on matching requests, matching among the users of the terminal apparatuses 2 having transmitted the matching requests. Specifically, the server 1 selects, from the matching requests, two matching requests that satisfy a conformity condition, and determines two users corresponding to the selected two matching requests, as participating users.

In the exemplary embodiment, the conformity condition is to satisfy both a matching conformity condition and a setting conformity condition. The matching conformity condition is that two matching requests are in such a relationship that an own use character in each matching request satisfies an opponent's matching condition. For example, when the matching conditions included in two matching requests are the same, since the own use character in each matching request satisfies the opponent's matching condition, whereby the matching conformity condition is satisfied. Moreover, for example, even when the matching conditions are different from each other such that the matching condition included in one of the two matching requests is "up to part 2 of story" while the matching condition included in the other matching request is "up to part 3 of story", the matching conformity condition is satisfied in some cases. For example, in the above case, if the use characters included in the respective matching requests are characters that appear by part 2 of the story, each use character satisfies the opponent's matching condition, thereby satisfying the matching conformity condition.

The setting conformity condition is that game settings in two matching requests conform with each other. Specifically, the setting conformity condition is that one of the following conditions (a) and (b) is satisfied: (a) priority setting information included in at least one of the matching requests indicates the opponent; (b) the pieces of priority setting information included in both the matching requests indicate the user himself/herself, and the pieces of information of game settings included in both the matching requests are the same. As will be described in detail below, game setting in the competitive game can be determined in the above case (a). However, in the above case where the pieces of priority setting information included in both the matching requests indicate the user himself/herself, the game settings that the respective users desire do no match unless the pieces of information of the game settings are the same, and therefore, game setting in the competitive game cannot be determined. Therefore, in the exemplary embodiment, the setting conformity condition is used in addition to the matching conformity condition, whereby game setting of the competitive game can be determined through matching.

Upon receiving a matching request from a terminal apparatus 2, the server 1 stores the received matching request. At an appropriate timing (e.g., when receiving a new matching request), the server 1 selects a pair of matching requests that satisfy the conformity condition, from among a plurality of matching requests being stored, and determines two users corresponding to the selected matching requests, as participating users.

When the participating users of the competitive game have been determined according to the matching requests, the information processing system determines game setting in the competitive game. FIG. 9 shows an example of a game setting determination method in the competitive game. In FIG. 9, one of the participating users is referred to as a user A and the other participating user is referred to as a user B. Hereinafter, a case where game settings of these participating users in the competitive game are determined will be described as an example.

First, in a case where the priority setting information in the matching request regarding the user A indicates the user himself/herself (i.e., "use own setting") while the priority setting information in the matching request regarding the other user B indicates the opponent (i.e., "leave it up to opponent"), the information processing system determines game setting in the competitive game to be information of game setting included in the matching request regarding the user A. In a case where the priority setting information in the matching request regarding the user A indicates the opponent while the priority setting information in the matching request regarding the other user B indicates the user himself/herself, the information processing system determines game setting in the competitive game so as to be information of game setting included in the matching request regarding the user B. Thus, when the priority setting information of the matching request of only one of the two participating users in the competitive game indicates the user himself/herself, the game setting indicated by this matching request is used in the competitive game. In the information of the game setting indicated by the matching request, if the user does not designate a map (i.e., when the option "any map" is designated), a map in the competitive game is determined by the server 1 by any method. For example, a predetermined map is adopted, or a map is determined at random from among a plurality of candidates.

In the matching requests regarding both the participating users, when the priority setting information in each matching request indicates the opponent, the information processing system determines game setting in the competitive game automatically (i.e., without being based on the matching request). That is, the time limit of the competitive game, the maps, and whether upper-limit breakthrough of a use character is valid or invalid, are automatically determined. In this case, there is no limitation on the specific determination method. The game setting may be determined to have a predetermined content, or may be selected at random from among a plurality of candidate contents.

In the matching requests regarding both the participating users, when the priority setting information in each matching request indicates the user himself/herself, the game settings in the respective matching requests are the same (because these two matching requests satisfy the setting conformity condition described above). Therefore, in this case, the information processing system determines game setting in the competitive game so as to have the information of the game setting included in the respective matching requests.

As described above, in the exemplary embodiment, a terminal apparatus, based on a user's operation input to the terminal apparatus, designates game setting information including: (a) first information (i.e., priority setting information indicating the user himself/herself) indicating game setting regarding rules of the competitive game (i.e., the game settings represented by the images 56 to 58), and indicating that the game setting is applied; or (b) second information (i.e., priority setting information indicating an opponent) indicating that game setting designated by another user to be an opponent is applied. The server determines participating users in the competitive game, based on the game setting information. Therefore, the user can perform the competitive game with desired game setting, in the case of determining an opponent through matching. In addition, since the second information can be designated, matching is easily performed.

The server 1 determines, as participating users, a user of a terminal apparatus that has transmitted a matching request including the game setting information including the first information, and a user of a terminal apparatus that has transmitted a matching request including the game setting information including the second information. In this case, the server 1 determines game setting in the competitive game to be performed by these terminal apparatuses, based on the game setting information including the first information. Thus, the participating users can be appropriately determined while enabling the competitive game to be performed with the game setting desired by the user.

The server 1 determines, as participating users, the users of two terminal apparatuses that have transmitted matching requests including the game setting information including the second information. In this case, the server 1 automatically determines game setting in the competitive game to be performed by these terminal apparatuses. By automatically determining the game setting, the users corresponding to the matching requests including the second information can be determined as participating users, whereby the matching is performed more easily.

The server 1 determines, as participating users, the users of two terminal apparatuses that have transmitted matching requests including the game setting information including the first information, under the condition that the game settings indicated by the first information are the same. In this case, the server 1 determines game setting in the competitive game to be performed by these terminal apparatuses, based on the game setting information. Thus, the users corresponding to the matching requests including the first information can be determined as participating users, whereby the matching is performed more easily.

In another embodiment, the information processing system may perform matching by using information different from a matching condition and game setting information included in a matching request. For example, in the another embodiment, the server 1 may associate each user with a rate different from a rate that is used in a rate battle mode described later, and may perform matching on the condition that the values of the rates of two users who play against each other are close to each other. The rate used in the free battle mode is different from the rate used in each rate battle mode, and the user may not be notified of the value of his/her own rate. Furthermore, for example, in order to reduce the possibility that a user frequently plays against the same user, the server 1 may perform matching such that users who have once played against each other will not play against each other for a predetermined period.

In the exemplary embodiment, the matching condition is a condition regarding a use character (specifically, a condition for determining whether or not a use character is appropriate). In another embodiment, the matching condition may not necessarily be a condition regarding a use character, and may include other conditions. The matching condition may include a condition regarding a user. Specifically, the matching condition may include: a condition regarding a period from when the user installs the game application; a condition regarding the number of characters that the user possesses; or a condition regarding the level of the user set in the game application. Using the matching condition regarding the user enables a beginner user to avoid a battle with an expert user, or enables each user to easily battle with an opponent whose level fits the user's level.

For the user of the terminal apparatus 2 having transmitted a matching request, the server 1 may perform battle matching with a team that is operated not by another user but by the information processing system, under a predetermined condition. For example, if the server 1 cannot perform matching even when a predetermined time has passed from reception of the matching request, the server 1 may match the user corresponding to the matching request with the team operated by the information processing system. Moreover, when performing battle matching based on the rate in the free battle mode (i.e., the rate different from the rate used in the rate battle mode), the server 1 may match a user whose rate is lower than a predetermined reference rate (i.e., a beginner user) with the team operated by the information processing system. The reason is as follows. It is generally considered that a competitive game with a team being operated by the information processing system is lower in difficulty than a competitive game with a team being operated by another user. Therefore, in the above case, it is possible to make a user, whose rate is lower than the predetermined reference rate, more likely to win the competitive game.

When the participating users and the game setting of the competitive game have been determined as described above, the server 1 transmits game data indicating information to be used for execution of the competitive game, to the terminal apparatuses 2 of the participating users. The game data includes, for example, information regarding an opponent (specifically, the user's name, use character, captain skill, etc., of the opponent), and information of the determined game setting. Thereafter, the competitive game is executed by the terminal apparatuses having received the game data, and the competitive game is progressed through appropriate communication performed between the terminal apparatuses.

As will be described in detail below, as for a competitive game in each rate battle mode, limitation is imposed on the period and the number of times in/by which a competitive game can be performed. Meanwhile, as for the free battle mode, no limitation is imposed on the period and the number of times in/by which a competitive game can be performed. In another embodiment, however, limitation may be imposed on the period and the number of times described above also in the free battle mode.

[2-4-2. First Rate Battle Mode]

The first rate battle mode is a game mode in which matching is performed based on a rate that is set for each user. In the exemplary embodiment, the information processing system sets a rate for each of users that perform a competitive game in a rate battle mode, and changes the value of the rate according to a game result. Furthermore, the information processing system sets a rank for each user according to the rate of the user. That is, the information processing system classifies the users into a plurality of ranks according to the rates of the users.

When performing a competitive game in the first rate battle mode, as in the case of the free battle mode, the terminal apparatus 2 transmits a matching request to the server 1 in response to a user's instruction to start the competitive game. This matching request includes information regarding the user of the terminal apparatus 2 (e.g., ID or the like of the user), information of a use character and a captain skill, and information indicating the game mode of the competitive game (specifically, information indicating the first rate battle mode). Since the user does not designate a matching condition and game setting in the rate battle mode, the matching request in the rate battle mode does not include information regarding a matching condition and game setting. The server 1 receives matching requests from the respective terminal apparatuses, and performs matching for the users of the terminal apparatuses having transmitted the matching requests. Then, the competitive game is performed by two participating users having been set through the matching.

In the exemplary embodiment, in the first rate battle mode, the server 1 performs matching based on the ranks of the users corresponding to the matching requests. For example, the server 1 performs matching such that users who are close in rank (e.g., users having a difference in rank not greater than 1). In the first rate battle mode, the server 1 may match a user with another user as an opponent of the user, or may match a user with a team operated by the information processing system, under a predetermined condition. For example, the server 1 may match a user whose rank is lower than a predetermined reference rank with the team operated by the information processing system. Furthermore, for example, the server 1 may match a user whose rank is lower than the predetermined reference rank and who has suffered consecutive defeats that are equal to or more than a predetermined reference, with the team operated by the information processing system. The reason is as follows. It is considered that a user is more likely to win a battle with a team being operated by the information processing system as compared to a battle with a real user. Therefore, by performing the matching that makes the user more likely to win as described above, this user is prevented from losing motivation to perform the competitive game.

Moreover, in the first rate battle mode, the server 1 changes the rate of the user having performed the competitive game, according to a result of the competitive game. Specifically, the server 1 raises the rate of a user who won the competitive game, and lowers the rate of a user who lost the competitive game. The server 1 may make a rate rise amount and a rate fall amount different according to a difference in rank between the users who have battled.

In the exemplary embodiment, the competitive game in the first rate battle mode can be played for a unit play period having a predetermined length (e.g., 3 days). That is, in the unit play period, a terminal apparatus 2 transmits a matching request regarding the first rate battle mode, and the server 1 performs matching based on the matching request. After the unit play period has elapsed, the server 1 gives a reward to the user, based on a record (e.g., rate or rank) of the user regarding the competitive game in the rate battle mode during the unit play period. The information processing system imposes limitation on the number of times one user can execute the competitive game in the first rate battle mode during one unit play period (e.g., the game is finished when the user has lost the game three times). This prevents a user who has performed the competitive game a larger number of times in the unit play period from being put at an advantage.

[2-4-3. Second Rate Battle Mode]

The second rate battle mode is a game mode in which matching is performed based on a rate that is set for each user, like the first rate battle mode. In the exemplary embodiment, the rate used in the first rate battle mode is different from the rate used in the second rate battle mode. In another embodiment, these modes may use the same rate. The second rate battle mode is identical to the first rate battle mode in that matching is performed based on the rate. A unit play period is also provided in the second rate battle mode, and a reward is also given to the user based on a record of the user during the unit play period, as in the first rate battle mode. Moreover, limitation is imposed on the number of times one user can execute the competitive game in the second rate battle mode during one unit play period.

The second rate battle mode is different from the first rate battle mode in that one user prepares a plurality of teams before performing the competitive game, while one user prepares one team in the first rate battle mode. Hereinafter, the second rate battle mode will be described mainly for the above difference, and description of the same or equivalent process as/to that of the first rate battle mode will be omitted.

Figure 10:
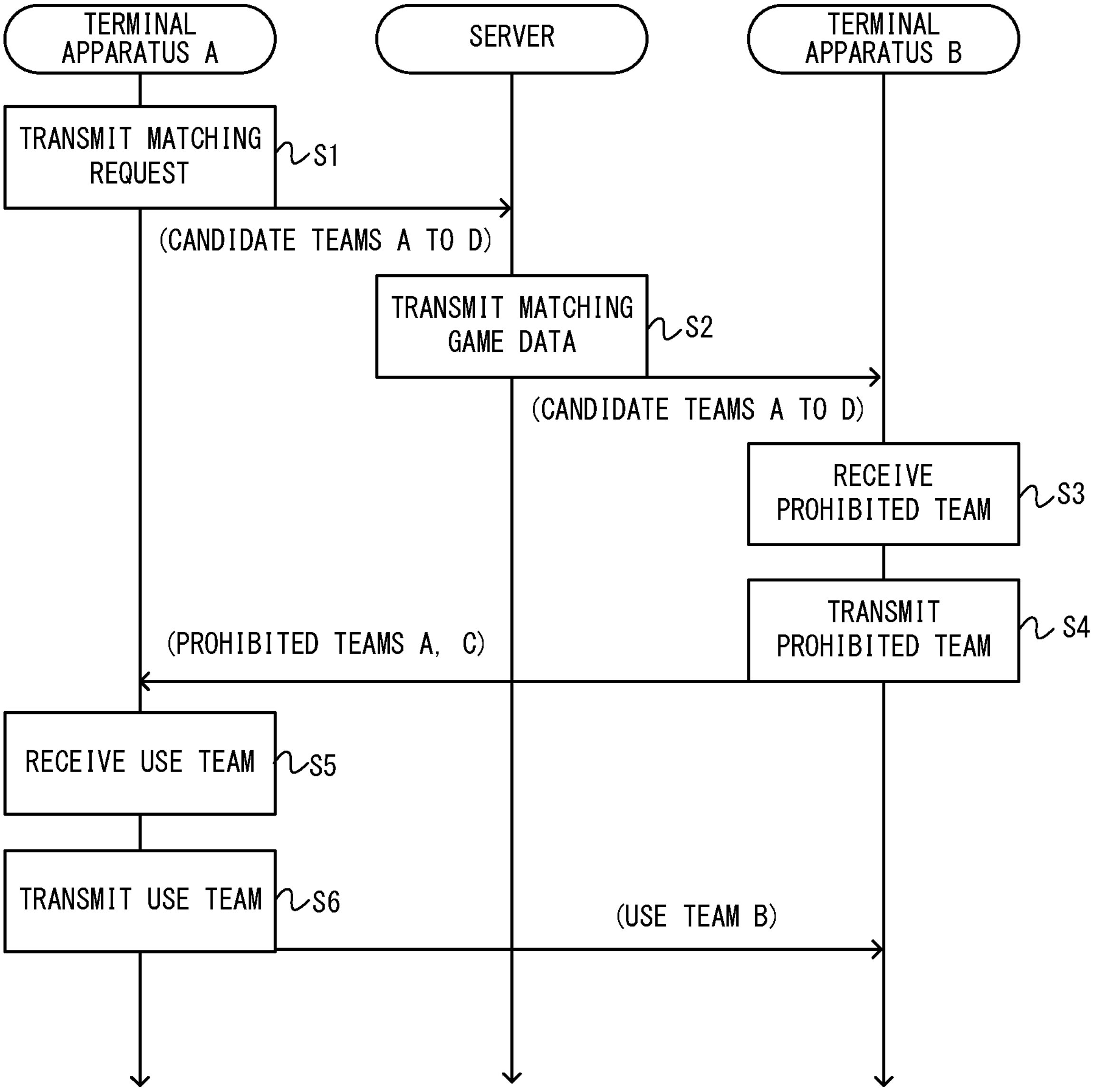
FIG. 10 shows an example of a process flow until a use team is determined in a second rate battle mode.

FIG. 10 shows an example of a process flow until a use team is determined in the second rate battle mode. In FIG. 10, a case where the competitive game in the second rate battle mode is performed by a user of a terminal apparatus A and a user of a terminal apparatus B being participating users, will be described as an example. FIG. 10 shows a process flow until a use team is determined in the terminal apparatus A. In actuality, a use team in the terminal apparatus B is also determined through a process similar to the process flow shown in FIG. 10.

In the exemplary embodiment, before a matching request is transmitted from a terminal apparatus 2 in the second rate battle mode, the user of the terminal apparatus 2 sets four candidate teams. The candidate teams are teams that are candidates for a use team to be used in the competitive game in the second rate battle mode. For example, in a state where a setting image (not shown) in the second rate battle mode is displayed, the terminal apparatus 2 receives, from the user, an input of designating use characters included in four candidate teams, and sets the use characters included in the respective candidate teams according to the input. In the exemplary embodiment, the terminal apparatus 2 does not receive an input that causes a single character to be included in a plurality of candidate teams. That is, the user cannot cause a single character to be included in a plurality of candidate teams. This prevents a plurality of candidate teams having similar character configurations from being set, and prevents a strong character from being included in all the candidate teams. Furthermore, the terminal apparatus 2 sets a captain skill of a captain character in each candidate team, according to an input of the user. As for the captain skill, the same captain skill may be redundantly set in the respective candidate teams.

After the candidate teams have been set in the second rate battle mode, the terminal apparatus A transmits a matching request to the server 1 in response to an instruction of the user, as shown in FIG. 10 (step S1). This matching request includes information regarding the user of the terminal apparatus A (e.g., ID or the like of the user), and information of the respective candidate teams (in FIG. 10, information of candidate teams A to D). Although not shown in FIG. 10, the server 1 also receives a matching request from the terminal apparatus B.

The server 1 performs matching based on the received matching requests, and transmits game data to be used for execution of the competitive game, to the terminal apparatuses A and B of the participating users determined through the matching (step S2). This game data includes, for example, information regarding an opponent (specifically, the user name, candidate teams, etc., of the opponent). In the example shown in FIG. 10, the server 1 transmits, to the terminal apparatus B, game data including the information of the candidate teams A to D of the terminal apparatus A. Although not shown in FIG. 10, the server 1 transmits, to the terminal apparatus A, game data including information of the candidate teams of the terminal apparatus B.

Upon receiving the game data from the server 1, the terminal apparatus B displays the information of the candidate teams A to D of the terminal apparatus A, and receives, from the user, an instruction designating prohibited teams, among the candidate teams A to D, which are prohibited from being used in this competitive game (step S3). The user of the terminal apparatus B designates two teams (in FIG. 10, the candidate teams A and C) as the prohibited teams from among the candidate teams A to D of the user of the terminal apparatus A. In the exemplary embodiment, the number of candidate teams that can be designated as prohibited teams is two. However, this number may be any number that is not less than 1 and is less than the number of candidate teams.

When receiving the above instruction, the terminal apparatus 2 displays, on the display section 24, the abilities (including skills) of the characters in the respective candidate teams so that the user can refer to the abilities when designating the prohibited teams. In the exemplary embodiment, the captain skills of the captain characters in the candidate teams are not displayed. The reason is as follows. As described above, in the competitive game, the content of the captain skill of the opponent is not presented to the user until the captain skill is exercised. Therefore, even before the competitive game, the content of the captain skill of the opponent is prevented from being known by the user.

The terminal apparatus B sets, as the prohibited teams, the teams designated by the user, and transmits information of the prohibited teams to the terminal apparatus A (step S4). Upon receiving the information of the prohibited teams, the terminal apparatus A receives, from the user, an input of designating one use team from among the candidate teams (in FIG. 10, the candidate teams B and D) excluding the prohibited teams (in FIG. 10, the candidate teams A and C), among the candidate teams A to D (step S5). The user of the terminal apparatus A designates a use team to be used in the competitive game from among the candidate teams excluding the prohibited teams. The terminal apparatus A transmits, to the terminal apparatus B, information indicating the use team designated by the user (in FIG. 10, the use team B) (step S6).

Thus, the use team in the terminal apparatus A is determined, and information of the use team is notified to the terminal apparatus B. As described above, a use team in the terminal apparatus B is also determined through a process similar to the process flow shown in FIG. 10. After the use teams in the terminal apparatuses A and B have been determined, the competitive game in the second rate battle mode is started in the terminal apparatuses A and B.

As described above, in the exemplary embodiment, in the second rate battle mode, the user can designate some of a plurality of candidate teams of the opponent user, as prohibited teams. This allows the user to inhibit a strong team or a team not compatible with the own team, among the plurality of candidate teams, from becoming a use team. Moreover, in the second rate battle mode, the strategic characteristics are increased in terms of formation of candidate teams, thereby further improving the strategic characteristics of the competitive game.

As described above, in the exemplary embodiment, the competitive game can be performed in at least one of the rate battle mode (i.e., the first rate battle mode or the second rate battle mode) and the free battle mode. In the rate battle mode, the rate associated with the user is changed according to the result of the competitive game, whereas, in the free battle mode, the rate is not changed according to the result of the competitive game. In the free battle mode, the server 1 performs determination of participating users, based on parameters regarding matching conditions (specifically, parameters regarding version information of characters), whereas, in the rate battle mode, the server 1 does not perform determination of participating users, based on the parameters. Thus, it is possible to provide the user with the game mode in which matching is performed by using the parameters. In the rate battle mode, it is possible to reduce the possibility that one of the users takes an excessive advantage due to the matching using the parameters.

In another embodiment, the competitive game may be performed in other game modes, in addition to the three game modes described above. For example, in another game mode, in a case where a user who is a friend of the user of a terminal apparatus 2 is registered in the terminal apparatus 2, matching may be performed such that the user can designate the friend user to battle with the friend user. In still another game mode, each user may be allowed to designate a specific password, and matching may be performed such that users who designate the same password battle each other. In still another embodiment, the information processing system may not necessarily perform the competitive game in the three game modes described above, and may perform the competitive game in only one of the three game modes.

In the exemplary embodiment, in the game application of the competitive game, another game different from the competitive game (e.g., the story game described above) may be performed. In the competitive game, the ability of a character possessed by the user may be modified as compared to the case where the character is used in the another game. For example, as for a character that will take more advantage in the competitive game than in the another game, the information processing system may limit or reduce a part of the ability of this character in the competitive game.

[3. Specific Example of Processing in Information Processing System]

Next, a specific example of information processing in the information processing system will be described with reference to FIG. 11 to FIG. 17.

[3-1. Data Used for Information Processing]

Figure 11:
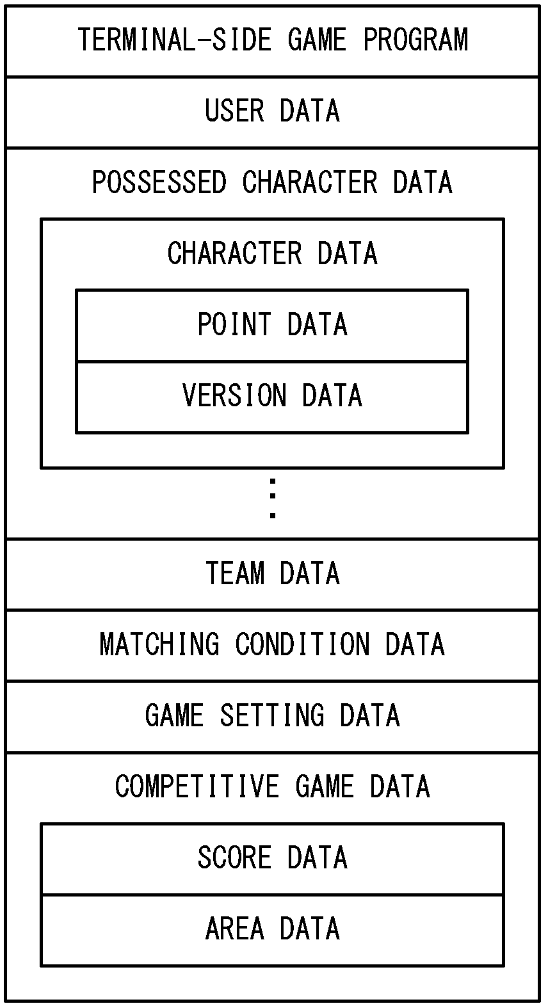
FIG. 11 shows an example of various data used for information processing in the non-limiting information processing system.
Figure 12:
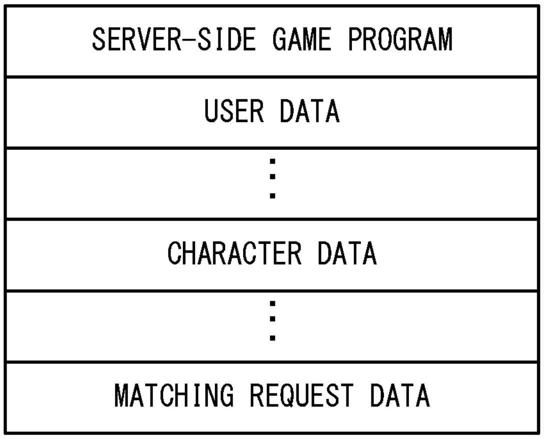
FIG. 12 shows an example of various data used for information processing in the non-limiting information processing system.

FIG. 11 and FIG. 12 show examples of various data used for the information processing in the information processing system. FIG. 11 shows an example of various data stored in the storage section 22 of a terminal apparatus 2, and FIG. 12 shows an example of various data stored in the storage section 12 of the server 1.

As shown in FIG. 11, the terminal apparatus 2 stores therein a terminal-side game program. The terminal-side game program is a game program on the terminal side for executing the game application, and is a program that allows the terminal apparatus 2 to execute a game process (process steps shown in FIG. 13 to FIG. 16). That is, when the processing section 21 of the terminal apparatus 2 executes the terminal-side game program, process steps described later (see FIG. 13 to FIG. 16) are executed in the terminal apparatus 2.

The terminal apparatus 2 stores therein at least user data, possessed character data, team data, matching condition data, game setting data, and competitive game data. In addition to these data, the terminal apparatus 2 stores therein various data to be used for execution of the competitive game.

The user data is data indicating various kinds of information regarding the user of the terminal apparatus 2. For example, the user data indicates the ID of the user, and information of items, points, currencies, etc., possessed by the user.

The possessed character data is data indicating various kinds of information regarding the characters possessed by the user of the terminal apparatus 2. In the exemplary embodiment, the possessed character data includes character data of each character. For example, the character data includes point data and version data of the character. The point data indicates the aforementioned character point associated with the character. The version data indicates the aforementioned version information associated with the character. In addition to the above data, the character data includes data indicating the ability values (e.g., level, hit points, attack power, defense power, etc.) of the character, and information of the skill possessed by the character.

The team data is data indicating information regarding a team used in the competitive game. For example, the team data indicates the characters included in the team, and information of the captain skill. The team data is stored for each team used in each game mode of the competitive game. Furthermore, as for the aforementioned second rate battle mode, team data is stored for each of candidate teams having been set.

The matching condition data is data indicating information of the matching condition that is set by the user in the aforementioned free battle mode. Specifically, the matching condition data indicates a value (i.e., a parameter) indicating a part, of a story, by which a character to be made usable should appear in the competitive game.

The game setting data is data indicating information regarding game setting that is set by the user in the aforementioned free battle mode. Specifically, the game setting data indicates the initial value of the move remaining time, information regarding maps, information indicating whether upper-limit breakthrough of a use character is valid or invalid, and priority setting information.

The competitive game data is data indicating information regarding the competitive game executed in the terminal apparatus 2 (e.g., the situation of the game). For example, the competitive game data includes score data and area data. The score data indicates a defeat score and a conquest score of each team in the competitive game. The area data indicates the position of a conquest area in the game space of the competitive game. Furthermore, the competitive game data includes data indicating the state (e.g., hit points and position) of each character in the competitive game. The competitive game data is updated at appropriate timings during the competitive game (e.g., at process steps S11, S17, S36, S39, S41, S43, and S45 described later).

As shown in FIG. 12, the server 1 stores therein a server-side game program. The server-side game program is a game program on the server side for executing the game application, and is a program that allows the server 1 to execute a server process (a process shown in FIG. 17). That is, when the processing section 11 of the server 1 executes the server-side game program, process steps described later (see FIG. 17) are executed in the server 1.

The server 1 stores therein user data, character data, and matching request data. In addition to these data, the server 1 stores therein various data to be used for execution of the competitive game.

The user data is data indicating information regarding users who perform the competitive game. The server 1 stores the user data for each user. The user data indicates the ID of the user, information of items, points, currencies, etc., possessed by the user in the game, and information of the game result of the user in the competitive game (e.g., the result of battles so far).

The character data is data indicating information regarding characters to be used in the game. The server 1 stores the character data for each character. The character data indicates the ability values (e.g., the level, attack power, defense power, etc.) of the character, information of the skill possessed by the character, and the like.

The matching request data is data indicating matching requests received from terminal apparatuses 2. In the exemplary embodiment, the server 1 stores therein data of a matching request received from a terminal apparatus 2, and deletes the data of the matching request when matching has been completed with respect to the matching request.

In addition to the data shown in FIG. 12, the server 1 may store therein a part or the entirety of the various data stored in the terminal apparatus 2 (see FIG. 11) to use the data for execution of the server process. The data to be used in the information processing system may be stored in either one of the server 1 and the terminal apparatus 2. When the same data is stored in the server 1 and the terminal apparatus 2, synchronization between the data stored in the server 1 and the data stored in the terminal apparatus 2 is performed at an appropriate timing.

[3-2. Process in Terminal Apparatus]

Figure 13:
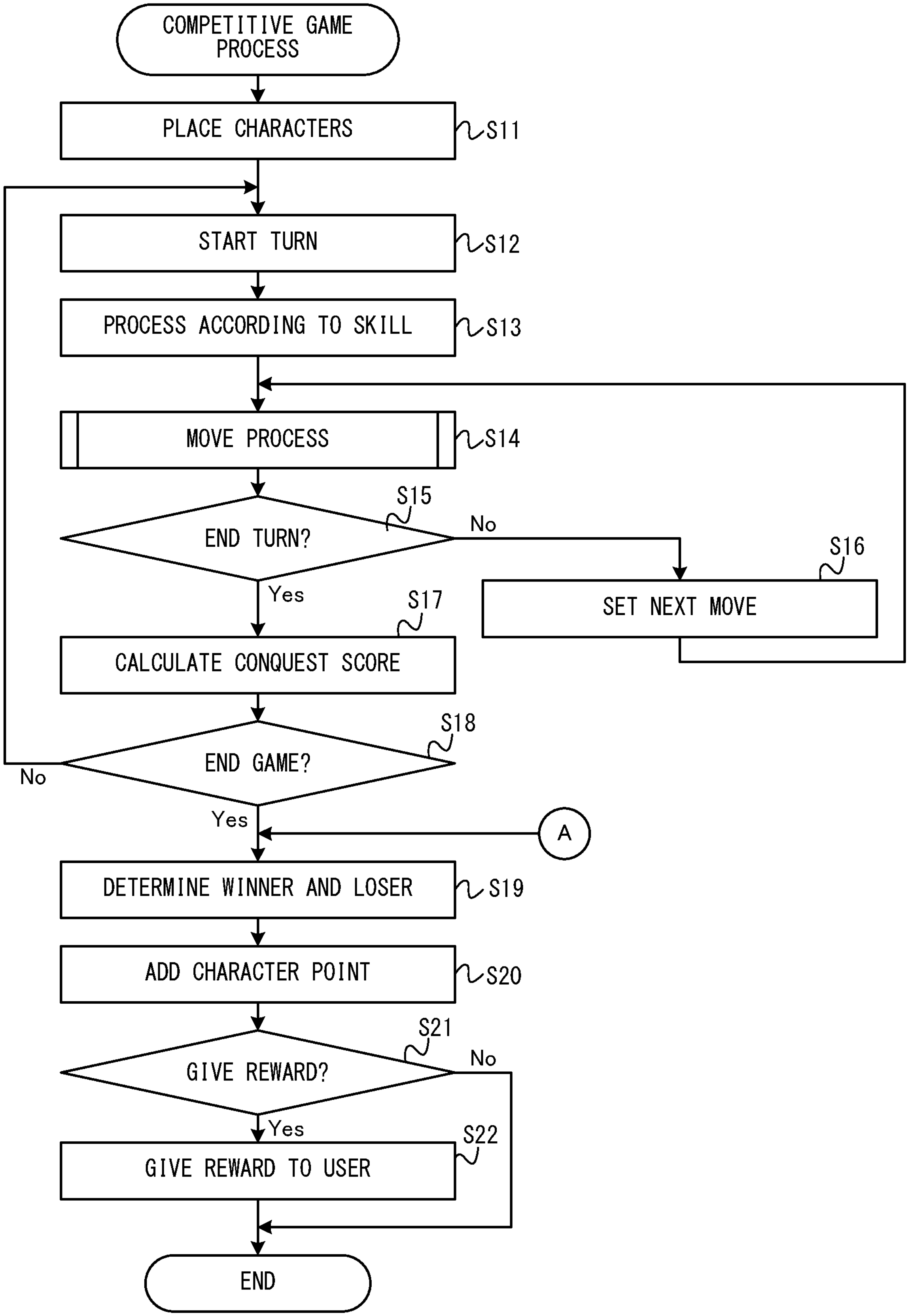
FIG. 13 is a flowchart showing an example of a flow of a competitive game process executed by the non-limiting terminal apparatus.

FIG. 13 is a flowchart showing an example of a flow of a competitive game process executed by a terminal apparatus. The competitive game process shown in FIG. 13 is started when a competitive game has been started in a terminal apparatus 2.

In the exemplary embodiment, a CPU (in other words, a processor) of the processing section 11 of the server 1 or the processing section 21 of the terminal apparatus 2 executes the game program stored in the storage section 12 or 22, thereby executing processes in steps shown in FIG. 13 to FIG. 17. However, in another embodiment, a part of the processes in the steps may be executed by a processor (e.g., a dedicated circuit or the like) other than the CPU. When the terminal apparatus 2 is communicable with the server 1, a part of the processes in the steps shown in FIG. 13 to FIG. 16 may be executed by the server 1. Meanwhile, a part of the processes in the steps shown in FIG. 17 may be executed by the terminal apparatus 2. The processes in the steps shown in FIGS. 13 to 17 are merely an example, and the processing order of the steps may be changed or another process may be executed in addition to (or instead of) the processes in the steps as long as similar results can be obtained.

The processing section 21 of the terminal apparatus 2 executes the processes in the steps shown in FIG. 13 to FIG. 16 by using a memory (or the storage section 22). That is, the CPU of the processing section 21 stores data obtained through the process steps into the memory, and reads out the data from the memory when using the data in the subsequent process steps. Likewise, the processing section 11 of the server 1 executes the processes in the steps shown in FIG. 17 by using a memory (or the storage section 12). That is, the CPU of the processing section 11 stores data obtained through the process steps into the memory, and reads out the data from the memory when using the data in the subsequent process steps.

In the competitive game process shown in FIG. 13, first, in step S11, the processing section 21 places, in a game space, characters included in teams in the competitive game for each of the teams. That is, the processing section 21 acquires data indicating an input performed by the user of the terminal apparatus 2, from the input section 23, and places own army characters in the game space, based on the acquired data. At this time, by using the communication section 25, the processing section 21 transmits data indicating placement of the own army characters to a terminal apparatus of an opponent user. Furthermore, by using the communication section 25, the processing section 21 receives data indicating placement of enemy army characters from the terminal apparatus of the opponent user, and places the enemy army characters in the game space, based on the received data. If the enemy army team is operated by the information processing system, the server 1 determines placement of the enemy army characters, and data indicating the placement is transmitted from the server 1 to the terminal apparatus 2. Furthermore, the processing section 21 causes the display section 24 to display a game image (see FIG. 4, for example) representing the state where the respective characters are placed in the game space. Next to step S11, the process in step S12 is executed.

In step S12, the processing section 21 starts a turn in the competitive game. Specifically, the processing section 21 determines a team to be a first mover at the start of the turn, according to the method described in the above "[2-1. Flow of competitive game]". Thus, the team to be the first mover is set in an operable state. Furthermore, the processing section 21 counts the number of turns in the competitive game. Next to step S12, the process in step S13 is executed.

In step S13, the processing section 21 executes a process according to a skill that is exercised at the start of the turn, among the skills possessed by the respective characters. For example, the aforementioned area shifting skill as an example of a captain skill is a skill, the effect of which is exerted at the start of the turn if the exercitation condition is satisfied. Therefore, when a captain character having the area shifting skill is present, the processing section 21 determines whether or not the exercitation condition is satisfied, and shifts the position of the conquest area in the game space when the exercitation condition is satisfied. The position of the conquest area is shifted according to the method described in the above "[2-3. Captain character]". In the above case, the processing section 21 updates the area data stored in the storage section 22 such that the area data indicates the position of the conquest area after the update. Next to step S13, the process in step S14 is executed.

In step S14, the processing section 21 executes a move process. The move process is a process for progressing the game in one move that is set for one team. Hereinafter, the move process will be described in detail with reference to FIG. 14.

Figure 14:
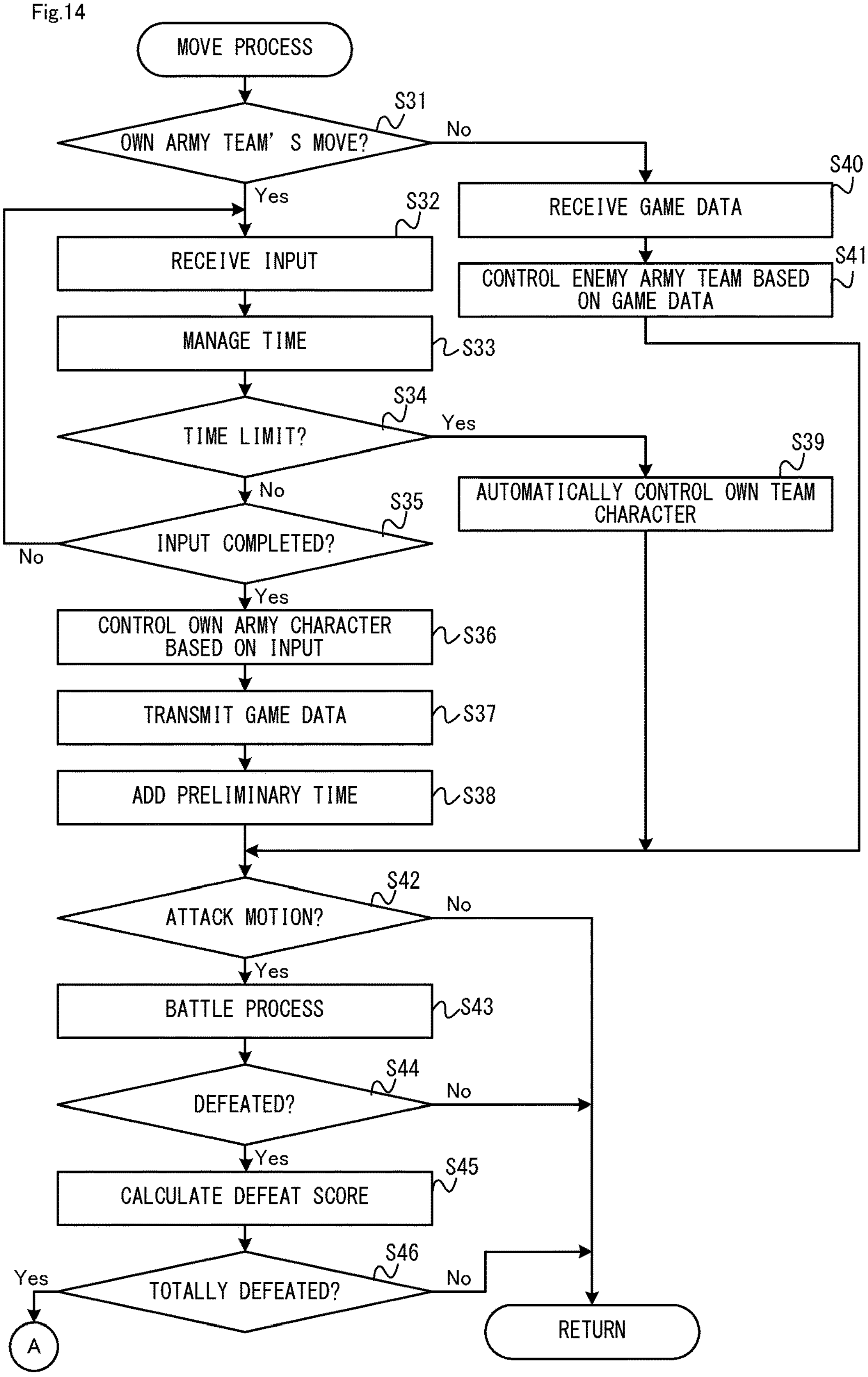
FIG. 14 is a sub-flowchart shows a specific flow of a move process in step S14 shown in FIG. 13.

FIG. 14 is a sub-flowchart showing an example of a specific flow of the move process in step S14 shown in FIG. 13. In the move process, first, in step S31, the processing section 21 determines whether or not the own army team is taking a move. This determination is performed based on the results of the processes in step S12 described above and step S15 described later in the competitive game process shown in FIG. 13. When the determination result in step S31 is positive, the process in step S32 is executed. When the determination result in step S31 is negative, the process in step S40 described later is executed.

In step S32, the processing section 21 receives an operation input for operating the own army team, performed by the user of the terminal apparatus 2. That is, the processing section 21 acquires, from the input section 23, data indicating the input performed by the user of the terminal apparatus 2. A processing loop of steps S32 to S35 is executed once every predetermined time period (e.g., one-frame time). Next to step S32, the process in step S33 is executed.

In step S33, the processing section 21 manages a move remaining time or a preliminary time in the current move. That is, the processing section 21 sets the move remaining time to an initial value when the move is started, and thereafter counts down the move remaining time or the preliminary time according to the method described in the above "[2-1. Competitive game]". Furthermore, the processing section 21 updates display of the remaining time area 34 in the game image displayed on the display section 24, each time a predetermined unit time (e.g., 1 second) elapses. Next to step S33, the process in step S34 is executed.

In step S34, the processing section 21 determines whether or not the user's operation time has reached a time limit, as a result of the countdown in step S33. When the determination result in step S34 is negative, the process in step S35 is executed. When the determination result in step S34 is positive, the process in step S39 described later is executed.

In step S35, the processing section 21 determines whether or not the operation input for operating the own army team, received in the process in step S32, has been completed. Specifically, the processing section 21 determines whether or not an operation input for causing an own army character to perform one action has been completed. For example, if an operation for moving the own army character is a drag operation from a pre-movement position of the own army character to a post-movement position of the own army character, the process in step S35 is a process of determining whether or not the drag operation has been completed. When the determination result in step S35 is positive, the process in step S36 is executed. When the determination result in step S35 is negative, the process in step S32 is again executed. Thereafter, a processing loop of steps S32 to S35 is repeatedly executed until it is determined in step S34 that the time limit has elapsed, or until it is determined in step S35 that the operation input has been completed.

In step S36, the processing section 21 controls the motion of the own army character, based on the inputs received in the processing loop of steps S32 to S35. Thus, the action of the own army character in one move has been performed. The processing section 21 updates the game image displayed on the display section 24 so as to reflect the motion of the own army character in the game image. Next to step S36, the process in step S37 is executed.

In step S37, by using the communication section 25, the processing section 21 transmits game data indicating the content of the action of the own army character controlled by the process in step S36, to the terminal apparatus of the opponent user. If the enemy army team is controlled by the information processing system, the processing section 21 transmits the game data to the server 1. Next to step S37, the process in step S38 is executed.

In step S38, the processing section 21 adds a preliminary time, based on the rest of the move remaining time at the completion of the operation on the own army character performed in the processing loop of steps S32 to S35. Specifically, the processing section 21 adds a time according to the rest of the move remaining time, to the current preliminary time, according to the method described in the above "[2-1. Flow of competitive game]". Next to step S38, the process in step S42 described later is executed.

On the other hand, in step S39, the processing section 21 automatically controls an own army character. That is, the processing section 21 automatically selects one of the own army characters, and automatically controls the motion of the selected own army character. Thus, when the user's operation time has reached the time limit, one of the own army characters performs a motion regardless of an instruction by the user. The processing section 21 updates the game image displayed on the display section 24 so as to reflect the motion of the own army character in the game image. Next to step S39, the process in step S42 described later is executed.

In step S40, by using the communication section 25, the processing section 21 receives game data indicating the content of an action of an enemy army character, from the terminal apparatus of the opponent user. During the competitive game, a series of processes shown in FIG. 13 and FIG. 14 is executed also in the terminal apparatus of the opponent user. Therefore, when the enemy army team is taking a move, the same process as in step S37 is executed by the terminal apparatus of the opponent user, whereby the game data is transmitted to the terminal apparatus 2. If the enemy army team is operated by the information processing system, the server 1 controls the motion of the enemy army character, and transmits game data indicating the content of the motion of the enemy army character, to the terminal apparatus 2. Next to step S40, the process in step S41 is executed.

In step S41, the processing section 21 controls the motion of the enemy army character, based on the game data received in step S40. Furthermore, the processing section 21 updates the game image displayed on the display section 24 so as to reflect the motion of the enemy army character in the game image. Next to step S41, the process in step S42 is executed.

In step S42, the processing section 21 determines whether or not the action of the character performed in step S36, S39, or S41 includes an attack motion. When the determination result in step S42 is positive, the process in step S43 is executed. When the determination result in step S42 is negative, the processing section 21 ends the move process shown in FIG. 14.

In step S43, the processing section 21 executes a battle process regarding a battle between an own army character and an enemy army character. The characters that perform the battle are the character having performed an attack motion in step S36, S39, or S41, and a character having been subjected to the attack motion. The processing section 21 performs a process of: calculating a damage that the attacked character receives, based on the character data regarding these characters and stored in the storage section 22 (more specifically, based on the ability values and the skills of these characters); and decreasing the hit points of the attacked character according to the damage. Although the above process is executed for the attacked character, if the attacked character is allowed to perform a counterattack, the process may be executed for the character having performed the attack. During execution of the battle process, the processing section 21 may display, on the display section 24, an animation in which the characters battle each other, instead of the image representing the game space. After the battle process has ended, next to step S43, the process in step S44 is executed.

In step S44, the processing section 21 determines whether or not the characters that have battled in step S43 are defeated (i.e., whether or not the hit points of the characters become 0). When the determination result in step S44 is positive, the process in step S45 is executed. When the determination result in step S44 is negative, the processing section 21 ends the move process shown in FIG. 14.

In step S45, the processing section 21 calculates the defeat score. Specifically, the processing section 21 adds points to the defeat score of the opponent team against the defeated character, according to the method described in the above "[2-2. Method for determining winner/loser in competitive game]". At this time, the processing section 21 updates the score data stored in the storage section 22 so that the score data indicates the defeat score after the addition. Furthermore, the processing section 21 causes the defeated character to disappear from the game space. Next to step S45, the process in step S46 is executed.

In step S46, the processing section 21 determines whether or not the own army team or the enemy army team has been totally defeated. That is, the processing section 21 determines whether or not the characters of the team, which includes the character having been determined as defeated in step S44, have been totally defeated. When the determination result in step S46 is negative, the processing section 21 ends the move process shown in FIG. 14. When the determination result in step S46 is positive, the processing section 21 executes the process in step S19 described later (see FIG. 13). In this case, the competitive game is ended.

Referring back to FIG. 13, in step S15, the processing section 21 determines whether or not to end the turn. Specifically, the processing section 21 determines whether or not the aforementioned turn end condition has been satisfied. When the determination result in step S15 is positive, the process in step S17 is executed. When the determination result in step S15 is negative, the process in step S16 is executed.

In step S16, the processing section 21 sets a team that takes a next move. The team that takes the next move is determined according to the method described in the above "[2-1. Flow of competitive game]". Thus, the team that takes the next move is set in an operable state. Next to step S16, the process in step S14 is executed again. Thereafter, a series of processes in step S14 to S16 is repeatedly executed until it is determined in step S15 to end the turn. Thus, the game is progressed while moves are sequentially set in the respective team during one turn.

In step S17, the processing section 21 calculates the conquest score. Specifically, the processing section 21 calculates the conquest score, based on the number of characters in the conquest area, according to the method described in the above "[2-2. Method for determining winner/loser in competitive game]". The processing section 21 can know the positions of the conquest area and the characters in the game space by referring to the competitive game data (specifically, area data, etc.) stored in the storage section 22. The processing section 21 updates the score data stored in the storage section 22 so that the score data indicates the calculated conquest score. Next to step S17, the process in step S18 is executed.

In step S18, the processing section 21 determines whether or not to end the competitive game. Specifically, the processing section 21 determines whether or not the aforementioned game end condition has been satisfied. When the determination result in step S18 is positive, the process in step S19 is executed. When the determination result in step S18 is negative, the process in step S12 is executed again. Thereafter, a series of processes in steps S12 to S18 is repeatedly executed until it is determined in step S18 to end the competitive game. Thus, the game is progressed while repeating the turns.

In step S19, the processing section 21 determines a winner and a loser in the competitive game. That is, when it is determined in step S46 that the own army team or the enemy army team has been totally defeated, the processing section 21 sets the not-totally-defeated team as a winner, and the totally-defeated team as a loser. When it is determined in step S18 to end the competitive game, the processing section 21 refers to the score data stored in the storage section 22, and sets the team having a larger sum of the defeat score and the conquest score as a winner while setting the team having a smaller sum as a loser. Next to step S19, the process in step S20 is executed.

In step S20, the processing section 21 adds the character point of the captain character of the own army team in the competitive game. This character point is added according to the method described in the above "[2-3. Captain character] ". The processing section 21 updates the point data stored in the storage section 22 so that the point data indicates the point after the addition. Next to step S20, the process in step S21 is executed.

In step S21, the processing section 21 determines whether or not to give a reward to the user of the terminal apparatus 2. By using the communication section 25, the processing section 21 transmits, to the server 1, game result data indicating the result of the competitive game and the added character point. Upon receiving the game result data from the terminal apparatus 2, the server 1 determines whether or not to give a reward to the user of the terminal apparatus 2, according to the method described in the above "[2-3. Captain character]". Then, the server 1 transmits, to the terminal apparatus 2, notification data indicating whether or not to give a reward to the user. In step S21, the processing section 21 receives the notification data by using the communication section 25, and performs the determination in step S21, based on the received notification data. When the determination result in step S21 is positive, the process in step S22 is executed. When the determination result in step S21 is negative, the processing section 21 ends the competitive game process shown in FIG. 13.

In step S22, the processing section 21 gives a reward according to the character point to the user of the terminal apparatus 2. That is, the processing section 21 updates the user data stored in the storage section 22 so that the user data indicates the given reward. After step S22 has ended, the processing section 21 ends the competitive game process shown in FIG. 13.

Figure 15:
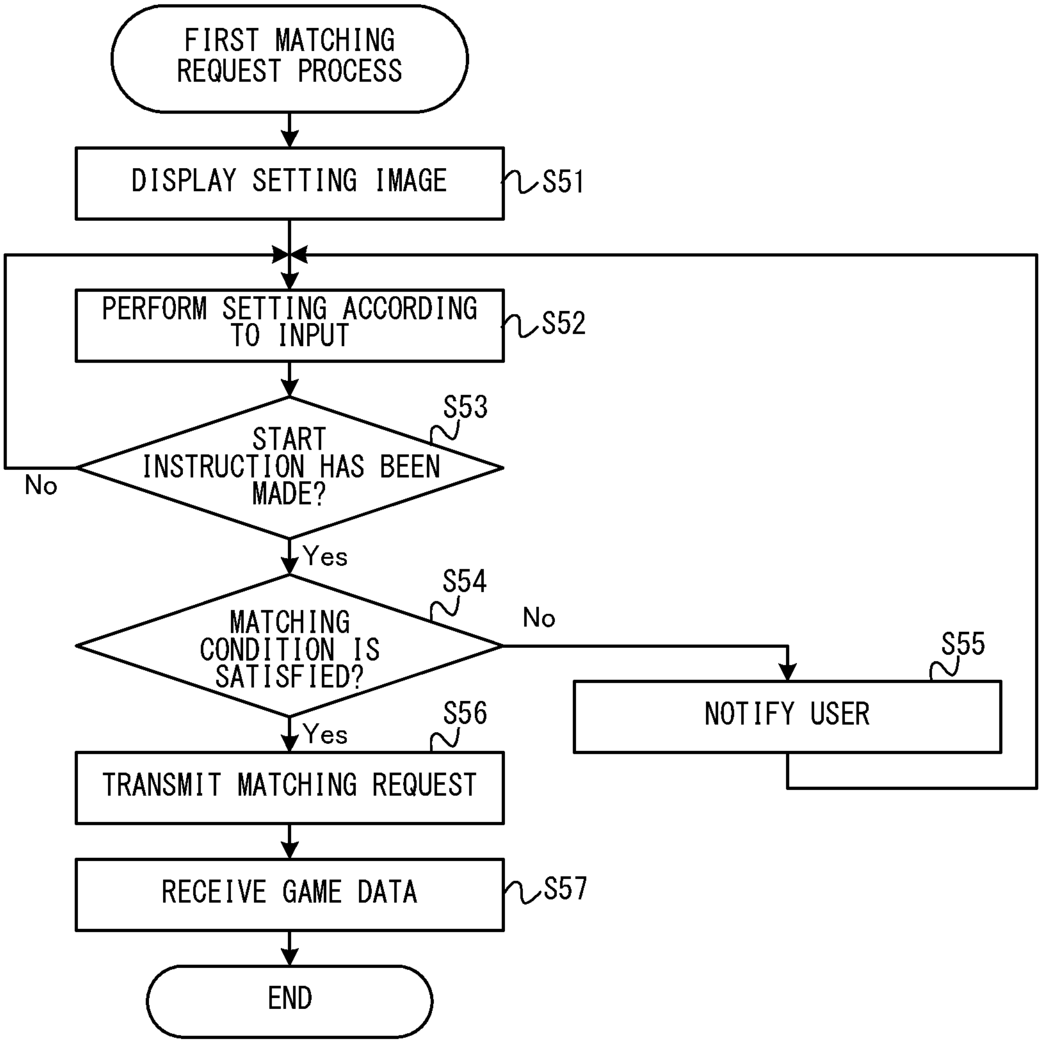
FIG. 15 is a flowchart showing an example of a flow of a first matching request process executed by the non-limiting terminal apparatus.

FIG. 15 is a flowchart showing an example of a flow of a first matching request process executed by a terminal apparatus. The first matching request process shown in FIG. 15 is started when the user has performed, on a predetermined menu screen, an instruction to execute the competitive game in the aforementioned free battle mode, during execution of the game application in the terminal apparatus 2.

In the first matching request process shown in FIG. 15, first, in step S51, the processing section 21 causes the display section 24 to display the setting image for the free battle mode (see FIG. 8). Then, the processing section 21 receives various inputs to the setting image. Next to step S51, the process in step S52 is executed.

In step S52, the processing section 21 executes a setting process in response to an input performed by the user to the setting image. Specifically, the processing section 21 acquires, from the input section 23, data indicating the input performed by the user of the terminal apparatus 2, and performs setting regarding a use character, a captain skill, a matching condition, and game setting, based on the acquired data. The processing section 21 updates the team data stored in the storage section 22 so as to reflect the contents of the set use character and captain skill in the team data, updates the matching condition data stored in the storage section 22 so as to reflect the content of the set matching condition in the matching condition data, and updates the game setting data stored in the storage section 22 so as to reflect the content of the set game setting in the game setting data. When the above setting has been performed, the processing section 21 updates the setting image displayed on the display section 24 so as to reflect the set contents in the setting image. Next to step S52, the process in step S53 is executed.

In step S53, the processing section 21 acquires, from the input section 23, data indicating an input performed by the user of the terminal apparatus 2, and determines, based on the acquired data, whether or not the aforementioned matching start instruction has been performed to the setting image. When the determination result in step S53 is positive, the process in step S54 is executed. When the determination result in step S53 is negative, the process in step S52 is again executed. Thereafter, a series of processes in step S52 and S53 is repeatedly executed until it is determined in step S53 that the matching start instruction has been performed.

In step S54, the processing section 21 determines whether or not the use character, which has been set in the process in step S53, satisfies the set matching condition. When the determination result in step S54 is negative, the process in step S55 is executed. When the determination result in step S54 is positive, the process in step S56 is repeated again.

In step S55, the processing section 21 notifies the user that the set use character does not satisfy the set matching condition. In addition, the processing section 21 performs a notification that urges the user to designate a use character or a matching condition again. The processing section 21 causes the display section 24 to display messages indicating these notifications, for example. Next to step S55, the process in step S52 is executed again.

Meanwhile, in step S56, the processing section 21 transmits a matching request to the server 1 by using the communication section 25. That is, the processing section 21 generates a matching request including the various kinds of information described in the above "[2-4-1. Free battle mode]", based on the various data stored in the storage section 22, and transmits the matching request to the server 1. As will be described in detail below, upon receiving the matching request, the server 1 transmits, to the terminal apparatus 2, game data according to the matching request (i.e., game data indicating information to be used for execution of the competitive game) (see step S76 described later). Next to step S56, the process in step S57 is executed.

In step S57, by using the communication section 25, the processing section 21 receives the game data transmitted from the server 1. This game data is game data to be used for execution of the competitive game, and includes information regarding an opponent, and information of the determined game setting, as described above. With the game data thus received, the terminal apparatus 2 can start the competitive game. After step S57 has ended, the processing section 21 ends the first matching request process shown in FIG. 15. Thereafter, the competitive game in the free battle mode is started, and the competitive game process shown in FIG. 13 is started.

Figure 16:
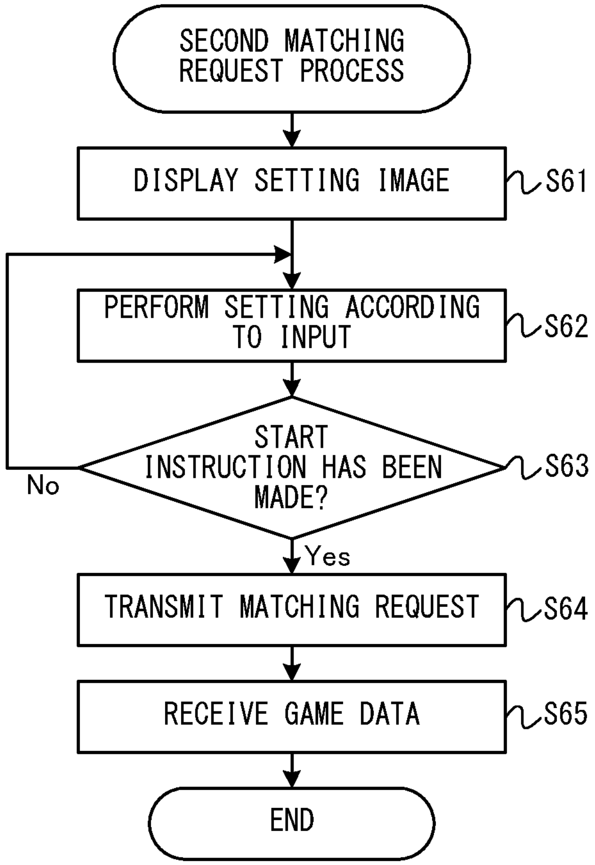
FIG. 16 is a flowchart showing an example of a flow of a second matching request process executed by the non-limiting terminal apparatus.

FIG. 16 is a flowchart showing an example of a flow of a second matching request process executed by a terminal apparatus. The second matching request process shown in FIG. 16 is started when the user has performed, on a predetermined menu screen, an instruction to execute the competitive game in the aforementioned rate battle mode, during execution of the game application in the terminal apparatus 2.

In the second matching request process shown in FIG. 16, in step S61, the processing section 21 causes the display section 24 to display the setting image according to the current game mode (i.e., the setting image in the first rate battle mode, or the setting image in the second rate battle mode). Then, the processing section 21 receives various inputs to the setting image. Next to step S61, the process in step S62 is executed.

In step S62, the processing section 21 executes a setting process in response to an input performed by the user to the setting image, as in step S52 described above. In step S62 in the second matching request process, specifically, the processing section 21 does not perform setting regarding a matching condition and game setting, and performs setting regarding a use character and a captain skill. Next to step S62, the process in step S63 is executed.

The processes in steps S63 to S65 in the second matching request process are identical to the processes in steps S53, S56, and S57 in the first matching request process. That is, the processing section 21 determines whether or not the aforementioned matching start instruction has been performed to the setting image (step S63), transmits a matching request to the server 1 (step S64) if the matching start instruction has been performed (Yes in step S63), and thereafter receives game data transmitted from the server 1 (step S65). If no matching start instruction is performed in the process in step S63 (No in step S63), the process in step S62 is executed again. After step S65 has ended, the processing section 21 ends the second matching request process shown in FIG. 16. Thereafter, the competitive game in the first rate battle mode or the second rate battle mode is started, and the competitive game process shown in FIG. 13 is started. In the second rate battle mode, a process of selecting a use team from among candidate teams is executed before the competitive game process is started, as described in the above "[2-4-3. Second rate battle mode]" (see FIG. 10).

[3-3. Process in Server]

Figure 17:
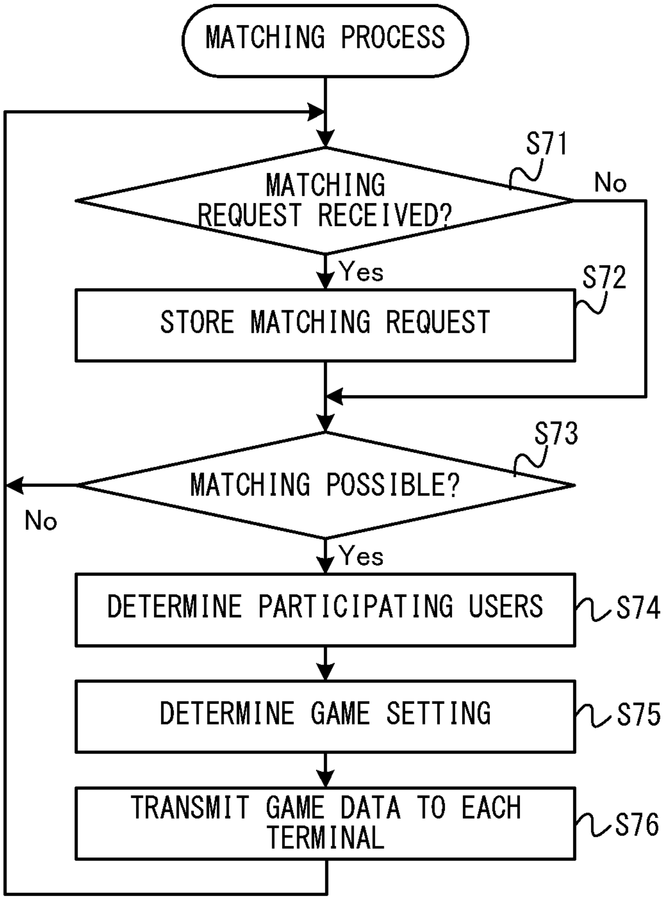
FIG. 17 is a flowchart showing an example of a flow of a matching process executed by the non-limiting server.

FIG. 17 is a flowchart showing an example of a flow of a matching process executed by the server. A series of processes shown in FIG. 17 is continuously executed while the server 1 is operating.

In the matching process shown in FIG. 17, first, in step S71, the processing section 11 determines whether or not a matching request transmitted from a terminal apparatus 2 has been received by using the communication section 13. When the determination result in step S71 is positive, the process in step S72 is executed. When the determination result in step S71 is negative, the process in step S72 is skipped and the process in step S73 is executed.

In step S72, the processing section 11 stores therein data of the received matching request. That is, the processing section 11 updates the matching request data stored in the storage section 12 so that the matching request data includes the data of the received matching request. Next to step S72, the process in step S73 is executed.

In step S73, the processing section 11 determines whether or not matching is possible among the matching requests being stored. In the exemplary embodiment, each matching request transmitted from the terminal apparatus 2 includes information indicating any of the game modes of the competitive game (i.e., the free battle mode, the first rate battle mode, and the second rate battle mode). The processing section 11 classifies the matching requests for each game mode, and performs the above determination for each game mode.

As for the matching requests in the free battle mode, the processing section 11 determines whether or not matching is possible, according to the method described in the above "[2-4-1. Free battle mode]". Specifically, the processing section 11 determines whether or not there are two matching requests that satisfy the aforementioned conformity condition (specifically, the matching conformity condition and the setting conformity condition) among the matching requests being stored. That is, the processing section 11 determines whether or not there are two matching requests that satisfy the matching conformity condition, among the matching requests indicated by the matching request data being stored in the storage section 12. This determination can be performed by referring to information regarding a use character, a matching condition, and game setting and stored in each matching request. If there are two matching requests as described above, the processing section 11 determines that matching is possible.

As for the matching requests in each rate battle mode, the processing section 11 determines whether or not matching is possible by performing matching based on the rates set for the users, as described in the above "[2-4-2. First rate battle mode]" and "[2-4-3. Second rate battle mode]".

When the determination result in step S73 is positive, the process in step S74 is executed. When the determination result in step S73 is negative, the process in step S71 is executed again.

In step S74, the processing section 11 determines participating users of the competitive game. Specifically, the processing section 11 determines, as participating users, two users corresponding to the two matching requests that have been determined in step S73 to be able to be matched. Next to step S74, the process in step S75 is executed.

In step S75, the processing section 11 determines game setting of the competitive game. The processing section 11 determines game setting of the competitive game in the free battle mode, according to the method described in the above "[2-4-1. Free battle mode]". Meanwhile, as for the competitive game in the rate battle mode, the processing section 11 determines game setting to be used for this competitive game so that the game setting has a predetermined content. Next to step S75, the process in step S76 is executed.

In step S76, by using the communication section 13, the processing section 11 transmits game data for performing the competitive game to each terminal apparatus 2 that performs the competitive game. That is, the processing section 11 generates game data including information regarding an opponent, and information of the determined game setting, and transmits the game data to each terminal apparatus 2. Next to step S76, the process in step S71 is executed again.

In the process in step S73, the processing section 11 may set a team that is operated by the information processing system as an opponent team against a certain user, thereby determining that matching is possible. In this case, one user is determined as a participating user in the process in step S74, and game data is transmitted to the corresponding one terminal apparatus 2 in the process in step S76. The processing section 11 generates characters to be included in the opponent team by any method based on the character data stored in the storage section 12, and transmits game data including information of the generated characters, to the terminal apparatus 2.

In the exemplary embodiment, the server 1 appropriately executes processes required for executing the competitive game in the terminal apparatus 2, in addition to the series of processes shown in FIG. 17. For example, in the case where one of the teams in the competitive game is controlled by the information processing system, the server 1 executes a process of controlling this team. When the competitive game has ended, the terminal apparatus 2 transmits result data indicating the result of the competitive game, to the server 1. Upon receiving the result data from the terminal apparatus 2, the server 1 updates the content of the user data stored in the storage section 12 so that the user data includes the result of the competitive game indicated by the result data. Thus, the result of the competitive game of each user is managed by the server 1.

[4. Functions and Effects of Exemplary Embodiment, and Modifications]

As described above, in the exemplary embodiment, the information processing system executes a competitive game in which a team including a plurality of objects (e.g., characters) competes with another team. The information processing system is configured to include the following means.

- Placement means configured to place the plurality of objects included in the team, in a game space, for each of the teams (step S11).
- Operation state setting means configured to set one of the teams in an operable state in which the objects included in the team are operable (step S12).
- Object control means configured to, during the competitive game, cause an object included in the team in the operable state to perform at least one action among multiple types of actions, based on an instruction performed by a user associated with the team or on a control performed by the information processing system, the multiple types of actions including movement in the game space, and battle with an object in the another team (steps S36 and S41).
- First evaluation value calculation means configured to calculate a first evaluation value (e.g., a defeat score), based on a result of the battle (step S45).
- Resetting means configured to, when the action of the object included in the team in the operable state has been performed a predetermined number of times, again set a team to be in an operable state, and progress the competitive game (step S16).
- Second evaluation value calculation means configured to, each time a progress state of the competitive game satisfies a first progress condition (e.g., a turn end condition), calculate a second evaluation value (e.g., a conquest score), based on the number of objects located in a predetermined area (e.g., a conquest area) included in the game space (step S17).
- Determination means configured to, when the progress state of the competitive game satisfies a second progress condition (e.g., a game end condition), determine a winner and a loser in the competitive game, based on the first evaluation value and the second evaluation value (step S19).

According to the above configuration, since a winner and a loser in the competitive game are determined based on the second evaluation value, a situation in which the objects of the teams battle each other in the predetermined area is more likely to occur, and a stalemate in which the objects of the teams do not battle while keeping a distance from each other is not likely to occur.

In the above configuration, the matching method in the competitive game is discretionary, and is not limited to the matching method of the exemplary embodiment. A team to be an opponent of a user may be a team operated by another user, or may be a team operated by the information processing system. In the exemplary embodiment, the competitive game in which two teams compete is described as an example. However, the competitive game according to the above configuration may be a game in which three or more teams compete.

In the above configuration, at least one of the plurality of teams is operated by a user. The other team may be operated by another user, or may be operated by the information processing system. In the former case, a plurality of objects included in each team are operated by the user corresponding to the team. Specifically, the information processing system includes a first information processing apparatus and a second information processing apparatus. When a first team corresponding to a first user of the first information processing apparatus is in an operable state, the first information processing apparatus causes an object in the first team to perform a game motion, based on an instruction of the first user. Meanwhile, when a second team corresponding to a second user of the second information processing apparatus is in an operable state, the first information processing apparatus receives information that is transmitted from the second information processing apparatus and indicates an instruction of the second user, and causes an object in the second team to perform a game motion, based on the received information.

In the latter case (i.e., in the case where the another team is operated by the information processing system), the information processing system includes a server and an information processing apparatus. When a team corresponding to a user of the information processing apparatus is in an operable state, the information processing apparatus causes an object in this team to perform a game motion, based on an instruction of the user. When the another team is in an operable state, the information processing apparatus receives information that is transmitted from the server and indicates an operation to the another team, and causes an object in the another team to perform a game motion, based on the received information.

The phrase "again set a team to be in an operable state" includes a case where the same team as the team having been in the operable state just before resetting is again set in an operable state (see FIG. 5).

The phrase "calculate a first evaluation value, based on a result of the battle" includes not only a case where the first evaluation value is always updated each time a battle is performed, but also a case where, when a battle is performed, the first evaluation value is not updated under a predetermined condition. That is, the phrase "calculate a first evaluation value, based on a result of the battle" includes a case where whether or not addition to the current first evaluation value should be performed is determined based on the result of the battle, and the first evaluation value is updated when the determination result is positive, as in the exemplary embodiment.

Likewise, the phrase "each time a progress state of the competitive game satisfies a first progress condition, calculate a second evaluation value, based on the number of objects located in a predetermined area included in the game space" includes not only a case where the second evaluation value is always updated each time the first progress condition is satisfied, but also a case where, when the first progress condition is satisfied, the second evaluation value is not updated under a predetermined condition. That is, the phrase "each time a progress state of the competitive game satisfies a first progress condition, calculate a second evaluation value, based on the number of objects located in a predetermined area included in the game space" includes a case where, each time the first progress condition is satisfied, whether or not addition to the current second evaluation value should be performed is determined based on the number of objects, and the second evaluation value is updated when the determination result is positive.

Each of the evaluation values (i.e., the first evaluation value and the second evaluation value) may be a value that is set for each team, like the defeat score or the conquest score in the exemplary embodiment, or may be a value that is not set for each team. For example, in another embodiment, each evaluation value may be a numerical value having a sign of positive or negative, and may be a value that is increased according to an action of the own army team and is decreased according to an action of the enemy army team. In this case, the information processing system may determine that the own army team is a winner if the evaluation value is positive at the end of the competitive game, and the enemy army team is a winner if the evaluation value is negative.

In the exemplary embodiment, it can also be said that the information processing system is a system for determining participating users of a competitive game, and is configured to include a server and a plurality of terminal apparatuses communicable with the server.

Each terminal apparatus executes processes as follows.

A process of, based on an operation input performed by a user to the terminal apparatus, designating a use object (e.g., a use character) to be used in the competitive game, from among a plurality of objects each being associated with a predetermined object parameter (e.g., version information indicating the number of parts of a story where a character appears) (step S52).

A process of, based on an operation input performed by the user to the terminal apparatus, designating a designation parameter indicating a value or a range of the object parameter (e.g., the designation parameter is a parameter that is related to the number of parts of a story where the character appears, and indicates the matching condition) (step S52).

A process of transmitting, to the server, a matching request including information regarding the designated use character and information regarding the designated designation parameter (step S56).

When the server receives, from a plurality of terminal apparatuses, matching requests in which the value of the object parameter of the use object corresponds to the value or the range of the designation parameter, the server determines, as participating users, users of two terminal apparatuses, among the plurality of terminal apparatuses, which are in such a relationship that the value of the object parameter of the use object included in the matching request of each terminal apparatus corresponds to the value or the range of the designation parameter included in the matching request of the other terminal apparatus (step S74).

According to the above configuration, the server can determine the participating users while imposing a limitation on use objects of an opponent by taking into consideration the designation parameter designated by the user. This enables the server to determine an opponent suitable to the user.

In the above configuration, there is no limitation on the content of the competitive game. The competitive game is not limited to a simulation game in which teams each including a plurality of characters compete with each other as in the exemplary embodiment, and may be a game of any type.

In the exemplary embodiment, the parameter indicating the matching condition and used as the designation parameter indicates the range of the object parameter, such as "from part 1 to part 3 of the story". Here, the designation parameter may indicate a value of the object parameter, such as "part 3 of the story".

The designation parameter may be any information indicating a value or a range of the object parameter, and may not necessarily be a value of the same type as the object parameter. For example, in the exemplary embodiment, the object parameter data is a value indicating version information. In the exemplary embodiment, since the value indicating the version information and the value indicating the number of parts of the story are uniquely associated with each other, it is possible to specify the value or the range of the object parameter data by the value or the range indicating the number of parts of the story. Therefore, the designation parameter may be a value or a range of the version information, or may be a value or a range indicating the number of parts of the story.

In the above configuration, the server may determine participating users when receiving, from a plurality of terminal apparatuses, the "matching requests in which the value of the object parameter of the use object corresponds to the value or the range of the designation parameter", and may or may not receive a "matching request in which the value of the object parameter data of the use object does not correspond to the value or the range of the designation parameter". When receiving such a matching request, the server may not determine participating users based on the matching request.

In the exemplary embodiment, when a process is executed with data (including a program) in a certain information processing apparatus, a part of data required for the process may be transmitted from another information processing apparatus different from the certain information processing apparatus. In this case, the certain information processing apparatus may execute the process by using the data received from the another information processing apparatus and the data stored therein.

In another embodiment, the information processing system may not include some of the components in the exemplary embodiment, and may not execute some of the processes executed in the exemplary embodiment. For example, in order to achieve a specific effect of a part of the exemplary embodiment, the information processing system may include a configuration for achieving the effect and may execute a process for achieving the effect, and may not include other configurations and may not execute other processes.

The exemplary embodiment can be used as, for example, a game system, a server, and a game program for the purpose of determining an opponent suitable for a user.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system that determines participating users of a competitive game, the information processing system comprising:

a server, and a plurality of terminal apparatuses communicable with the server, each of the terminal apparatuses being configured to at least:

designate, based on an operation input performed by a user to the terminal apparatus, a use object to be used in the competitive game from among a plurality of objects that are each associated with an object parameter;

designate, based on an operation input performed by the user to the terminal apparatus, a designation parameter that includes version data for the use object; and transmit, to the server, a matching request including information regarding the designated use object and information regarding the designated designation parameter, the server being configured to at least:

receive, from a plurality of terminal apparatuses, matching requests in which a value of the object parameter of the use object corresponds to version data of the designation parameter;

based on the matching requests, match, as the participating users for an instance of the competitive game, users of two terminal apparatuses, among the plurality of terminal apparatuses, which are in such a relationship that a value of the object parameter of the use object included in the matching request of each terminal apparatus corresponds to the version data of the designation parameter included in the matching request of the other terminal apparatus; and transmit, to the two terminal apparatuses, first data for conducting the competitive game on each of the respective two terminal apparatuses, wherein each of the terminal apparatuses are further configured to at least:

execute, based on the first data, the competitive game that includes a virtual game space that includes a plurality of virtual characters that are associated with an object parameter that corresponds to the version data of the designation parameter; and process operation input received from the user of a respective terminal apparatus and based on the operation input, move at least one of the plurality of virtual characters within the virtual game space.

2. The information processing system according to claim 1, wherein the terminal apparatus executes an application of the competitive game, and the version data indicates a version of the application that includes the use object.

3. The information processing system according to claim 1, wherein the terminal apparatus executes an application of the competitive game, and the version data indicates a time when the use object has become usable in the application.

4. The information processing system according to claim 1, wherein an application of the competitive game includes a plurality of games different from the competitive game, each of the plurality of objects appears in any of the plurality of games, and the version data which one of the plurality of games in which the use object appears.

5. The information processing system according to claim 1, wherein each of the plurality of objects belongs to any of a plurality of groups, and the version data which one of the plurality of groups the use object belongs.

6. The information processing system according to claim 1, wherein the competitive game can be executed in at least one of a first mode and a second mode, a rate associated with the user varies according to a result of the competitive game in the first mode, and the rate does not vary according to the result of the competitive game in the second mode, and the server, in the second mode, performs determination of participating users based on the designation parameter, and in the first mode, does not perform determination of participating users based on the designation parameter.

7. The information processing system according to claim 1, wherein the terminal apparatus, based on an operation input performed by the user to the terminal apparatus, further designates game setting information including: (a) first information indicating game setting regarding a rule of the competitive game and indicating that the game setting is applied; or (b) second information indicating that game setting designated by another user to be an opponent is applied, the matching request includes the designated game setting information, and the server determines the participating users, based on the game setting information included in the matching request.

8. The information processing system according to claim 7, wherein the server determines, as the participating users, a user of the terminal apparatus that has transmitted the matching request including the game setting information including the first information, and a user of the terminal apparatus that has transmitted the matching request including the game setting information including the second information, and determines the game setting in the competitive game to be performed by the terminal apparatuses, based on the game setting information including the first information.

9. The information processing system according to claim 7, wherein the server determines, as the participating users, users of two terminal apparatuses that have transmitted the matching requests including the game setting information including the second information, and automatically determines the game setting in the competitive game to be performed by the terminal apparatuses.

10. The information processing system according to claim 7, wherein the server determines, as the participating users, users of two terminal apparatuses that have transmitted matching requests including the game setting information including the first information, under a condition that the game settings indicated by the first information are the same, and determines the game setting in the competitive game to be performed by the terminal apparatuses, based on the game setting information.

11. A server that determines participating users who participate in a competitive game from among a plurality of users, the server comprising:

a processor and a memory coupled thereto, the processor being configured to control the server to at least:

receive a matching request from a terminal apparatus of each of the users, the matching request including information regarding (1) an object that is designated, based on an operation input performed by a user to the terminal apparatus, a use object to be used in the competitive game from among a plurality of objects that are each associated with an object parameter, (2) a designation parameter that includes version data for the use object; and when receiving, from a plurality of terminal apparatuses, matching requests in which a value of the object parameter of the use object corresponds to version data of the designation parameter;

based on the matching requests, match, as the participating users for an instance of the competitive game, users of two terminal apparatuses, among the plurality of terminal apparatuses, which are in such a relationship that a value of the object parameter of the use object included in the matching request of each terminal apparatus corresponds to the version data of the designation parameter included in the matching request of the other terminal apparatus; and transmit, to the two terminal apparatuses, first data for conducting the competitive game on each of the respective two terminal apparatuses, wherein each of the terminal apparatuses are caused to execute, based on the transmitted first data, the competitive game that includes a virtual game space that includes a plurality of virtual characters that are associated with an object parameter that corresponds to the version data of the designation parameter.

12. The server according to claim 11, wherein the terminal apparatus executes an application of the competitive game, and the version data indicates a version of the application that includes the use object.

13. The server according to claim 11, wherein the terminal apparatus executes an application of the competitive game, and the version data indicates a time when the use object has become usable in the application.

14. The server according to claim 11, wherein an application of the competitive game includes a plurality of games different from the competitive game, each of the plurality of objects appears in any of the plurality of games, and the version data indicates which one of the plurality of games in which the use object appears.

15. The server according to claim 11, wherein each of the plurality of objects belongs to any of a plurality of groups, and the version data indicates which one of the plurality of groups the use object belongs.

16. A non-transitory computer-readable storage medium having stored therein instructions that, when executed by a processor of a server that determines participating users who participate in a competitive game from among a plurality of users, cause the server to perform operations comprising:

receiving a matching request from a terminal apparatus of each of the users, the matching request including information regarding (1) an object that is designated, based on an operation input performed by a user to the terminal apparatus, a use object to be used in the competitive game from among a plurality of objects that are each associated with an object parameter, (2) a designation parameter that includes version data for the use object; and when receiving e, from a plurality of terminal apparatuses, matching requests in which a value of the object parameter of the use object corresponds to version data of the designation parameter, based on the matching requests, matching, as the participating users for an instance of the competitive game, users of two terminal apparatuses, among the plurality of terminal apparatuses, which are in such a relationship value of the object parameter of the use object included in the matching request of each terminal apparatus corresponds to the version data of the designation parameter included in the matching request of the other terminal apparatus; and transmitting, to the two terminal apparatuses, first data for conducting the competitive game on each of the respective two terminal apparatuses, wherein each of the terminal apparatuses are caused to execute, based on the transmitted first data, the competitive game that includes a virtual game space that includes a plurality of virtual characters that are associated with an object parameter that corresponds to the version data of the designation parameter.

17. The non-transitory computer-readable storage medium according to claim 16, wherein the terminal apparatus executes an application of the competitive game, and the version data indicates a version of the application that includes the use object.

18. The non-transitory computer-readable storage medium according to claim 16, wherein the terminal apparatus executes an application of the competitive game, and the version data indicates a time when the use object has become usable in the application.

19. The non-transitory computer-readable storage medium according to claim 16, wherein an application of the competitive game includes a plurality of games different from the competitive game, each of the plurality of objects appears in any of the plurality of games, and the version data indicates which one of the plurality of games in which the use object appears.

20. An information processing method executed on a server computer system that is configured to communicate with a plurality of terminal apparatuses of participating users who participate in a competitive game from among a plurality of users, the information processing method comprising:

receiving a matching request from a terminal apparatus of each of the users, the matching request including information regarding (1) an object that is designated, based on an operation input performed by a user to the terminal apparatus, a use object to be used in the competitive game from among a plurality of objects that are each associated with an object parameter, (2) a designation parameter that includes version data for the use object; and when receiving, from a plurality of terminal apparatuses, matching requests in which a value of the object parameter of the use object corresponds to version data of the designation parameter;

based on the matching requests, matching, as the participating users for an instance of the competitive game, users of two terminal apparatuses, among the plurality of terminal apparatuses, which are in such a relationship that a value of the object parameter of the use object included in the matching request of each terminal apparatus corresponds to the version data of the designation parameter included in the matching request of the other terminal apparatus; and transmitting, to the two terminal apparatuses, first data for conducting the competitive game on each of the respective two terminal apparatuses, wherein each of the terminal apparatuses are caused to execute, based on the transmitted first data, the competitive game that includes a virtual game space that includes a plurality of virtual characters that are associated with an object parameter that corresponds to the version data of the designation parameter.

21. The information processing method according to claim 20, wherein the terminal apparatus executes an application of the competitive game, and the version data indicates a version of the application that includes the use object.

22. The information processing method according to claim 20, wherein the terminal apparatus executes an application of the competitive game, and the version data indicates a time when the use object has become usable in the application.

23. The information processing method according to claim 20, wherein an application of the competitive game includes a plurality of games different from the competitive game, each of the plurality of objects appears in any of the plurality of games, and the version data indicates which one of the plurality of games in which the use object appears.

* * * * *